(12) United States Patent
Ogawa

(10) Patent No.: US 9,155,095 B2
(45) Date of Patent: Oct. 6, 2015

(54) RADIO COMMUNICATION APPARATUS, RADIO COMMUNICATION SYSTEM, AND RADIO COMMUNICATION METHOD

(71) Applicant: FUJITSU LIMITED, Kawasaki-shi, Kanagawa (JP)

(72) Inventor: Daisuke Ogawa, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 13/947,871

(22) Filed: Jul. 22, 2013

(65) Prior Publication Data

US 2013/0301592 A1   Nov. 14, 2013

Related U.S. Application Data

(63) Continuation of application No. PCT/JP2011/051709, filed on Jan. 28, 2011.

(51) Int. Cl.
   *H04L 1/00* (2006.01)
   *H04W 72/04* (2009.01)
   *H04W 88/02* (2009.01)

(52) U.S. Cl.
   CPC .......... *H04W 72/0453* (2013.01); *H04W 88/02* (2013.01)

(58) Field of Classification Search
   CPC ..... H04W 72/04; H04W 72/05; H04W 72/06; H04W 72/0446; H04W 72/0447; H04W 72/0448
   USPC .......... 370/229, 230, 329, 330, 341; 455/464, 455/516, 450, 517, 509
   See application file for complete search history.

(56) References Cited

U.S. PATENT DOCUMENTS

2006/0002421 A1*  1/2006  Kuwahara et al. ............ 370/464

FOREIGN PATENT DOCUMENTS

| JP | 2006-19850 A | 1/2006 |
| JP | 2010-114780 A | 5/2010 |
| JP | 2010-178024 A | 8/2010 |

OTHER PUBLICATIONS

3GPP TS 36.211 V9.1.0(Mar. 2010), 3rd Generation Partnership Project: Technical Specification Group Radio Access Network; Evolved Universal Terrestrial Radio Access(E-UTRA); Physical Channels and Modulation(Release 9), Mar. 2010, 85 pages.
CMCC, "Key Issues nn Carrier Aggregation," 3GPP TSG RAN WG1 Meeting #55, R1-084332, Nov. 10-14, 2008, col. 2.3, lines 1 to 2, 3 pages.
International Search Report issued in PCT/JP2011/051709, mailed Mar. 29, 2011, 2 pages.

* cited by examiner

*Primary Examiner* — Dady Chery
(74) *Attorney, Agent, or Firm* — Arent Fox LLP

(57) ABSTRACT

In a radio communication apparatus a configuration section sets transmission bands and receiving bands in a band group. A configuration control section controls the configuration section so that each of the receiving bands is not included between the transmission bands in the band group. In a radio communication apparatus a filter section includes a filter which can extract transmission bands lumped together. When a band group which is transmitted from the radio communication apparatus and in which setting is performed so that each of receiving bands is not included between transmission bands is received, a filter control section controls the filter section so as to extract the transmission bands from the received band group.

8 Claims, 27 Drawing Sheets

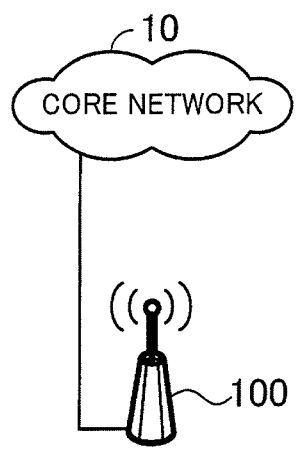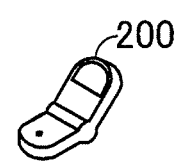
FIG. 2

CONFIGURATION TABLE 124a

| HOUR | CC #0 | CC #1 | CC #2 | CC #3 | CC #4 |
|------|-------|-------|-------|-------|-------|
| T0   | D     | D     | D     | D     | D     |
| T1   | S     | S     | S     | S     | S     |
| T2   | U     | U     | U     | U     | U     |
| T3   | U     | U     | D     | U     | U     |
| T4   | D     | D     | D     | U     | U     |

FIG. 8

CONFIGURATION TABLE 324a

| HOUR | CC #0 | CC #1 | CC #2 | CC #3 | CC #4 |
|------|-------|-------|-------|-------|-------|
| T0 | D | D | D | D | D |
| T1 | S | S | S | S | S |
| T2 | U | U | U | U | U |
| T3 | D | U | U | U | U |
| T4 | D | D | D | U | U |
| ⋮ | ⋮ | ⋮ | ⋮ | ⋮ | ⋮ |

FIG. 17

CONFIGURATION TABLE 524a

| HOUR | CC #0 | CC #1 | CC #2 | CC #3 | CC #4 |
|------|-------|-------|-------|-------|-------|
| T0   | D     | D     | D     | D     | D     |
| T1   | S     | S     | S     | S     | S     |
| T2   | U     | U     | U     | U     | U     |
| T3   | U     | U     | D     | U     | U     |
| T4   | U     | D     | D     | D     | U     |
| ⋮    | ⋮     | ⋮     | ⋮     | ⋮     | ⋮     |

ARRANGEMENT OF DLS AND ULS AT TIME OF USING FIVE CCS

| CC NUMBER | ARRANGEMENT | DL GROUP NUMBER | CC NUMBER | ARRANGEMENT | DL GROUP NUMBER |
|---|---|---|---|---|---|
| 1 | DDDDD | 1 | 17 | DDUUU | 1 |
| 2 | DDDDU | 1 | 18 | DUDUU | 2 |
| 3 | DDDUD | 2 | 19 | DUUDU | 2 |
| 4 | DDUDD | 2 | 20 | DUUUD | 2 |
| 5 | DUDDD | 2 | 21 | UDDUU | 1 |
| 6 | UDDDD | 1 | 22 | UDUDU | 2 |
| 7 | DDDUU | 1 | 23 | UDUUD | 2 |
| 8 | DDUDU | 2 | 24 | UUDDU | 1 |
| 9 | DDUUD | 2 | 25 | UUDUD | 2 |
| 10 | DUDDU | 2 | 26 | UUUDD | 1 |
| 11 | DUDUD | 3 | 27 | DUUUU | 1 |
| 12 | DUUDD | 2 | 28 | UDUUU | 1 |
| 13 | UDDDU | 1 | 29 | UUDUU | 1 |
| 14 | UDDUD | 2 | 30 | UUUDU | 1 |
| 15 | UDUDD | 2 | 31 | UUUUD | 1 |
| 16 | UUDDD | 1 | — | — | — |

RADIO COMMUNICATION APPARATUS, RADIO COMMUNICATION SYSTEM, AND RADIO COMMUNICATION METHOD

CROSS-REFERENCE TO RELATED APPLICATION

This application is a continuation application of International Application PCT/JP2011/051709 filed on Jan. 28, 2011 which designated the U.S., the entire contents of which are incorporated herein by reference.

FIELD

The embodiments discussed herein are related to a radio communication apparatus, a radio communication system, and a radio communication method for performing a decoding process.

BACKGROUND

In recent years a technique, such as OFDM (Orthogonal Frequency Division Multiplexing) or TDD (Time Division Duplex), has been used in radio communication for realizing high frequency use efficiency. A radio communication system using such a technique is, for example, 3GPP (3rd Generation Partnership Project)-LTE (Long Term Evolution).

In order to realize higher-speed communication for a next generation radio communication system, standardization of LTE-A (LTE-Advanced) is in progress in 3GPP. Carrier aggregation (hereinafter referred to as the CA) which is a technique for realizing high-speed communication by the use of a plurality of bands is known (see, for example, Japanese Laid-open Patent Publication No. 2010-178024 and Japanese Laid-open Patent Publication No. 2010-114780).

With the CA transmission and receiving are performed by the use of a component carrier group in which a plurality of (five, for example) LTE carriers (hereinafter referred to as component carriers (CCs)) are linked together.

An LTE-A user can perform LTE communication by the use of a component carrier group made up of one to five component carriers (by the use of a bandwidth of a maximum of 100 MHz, for example). Each (having a bandwidth of, for example, 20 MHz) of a plurality of component carriers used in LTE-A is compatible with LTE, so an LTE-A user can communicate with an LTE user.

Furthermore, with a TDD system the ratio of UL (Uplink) radio frames to DL (DownLink) radio frames can be controlled flexibly. With a TDD-LTE system in which TDD is applied to LTE, the ratio of UL subframes to DL subframes can also be changed. Several UL-DL subframe configurations are defined.

If a component carrier group is used for defining a UL-DL subframe configuration, a UL signal component is an interference component for a DL signal component. Therefore, only a desired DL signal component needs to be extracted on a receiver side.

On the other hand, UL signal components and DL signal components may mingle on the receiver side on the basis of a UL-DL subframe configuration in a component carrier group.

In order to extract a DL signal component without being interfered with by a UL signal component, the following method, for example, may be adopted on a receiver side. Analog filters the number (five, for example) of which corresponds to that (five, for example) of component carriers included in a component carrier group are prepared and are arranged in parallel so that they will treat the component carriers on a one-to-one basis.

A passing bandwidth of each analog filter is set according to the bandwidth of a corresponding component carrier. As a result, if a signal transmitted by the use of the component carrier group is received on the receiver side, analog filters through which the signal can pass are changed in accordance with a UL-DL subframe configuration of each component carrier at each hour. By doing so, only DL component carriers can be extracted. In this case, however, analog filters the number of which (five, for example) is the same as that of the component carriers are included. As a result, circuit scale increases.

SUMMARY

According to an aspect of the embodiments to be discussed herein, there is provided a radio communication apparatus which transmits and receives data by the use of a band group including a plurality of bands that is setable as transmission bands used for data transmission or as receiving bands used for data receiving. The apparatus includes a configuration section which sets the transmission bands and the receiving bands in the band group; and a configuration control section which controls the configuration section so that each of the receiving bands is not included between the transmission bands in the band group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates the entire configuration of a radio communication system according to a second embodiment;

FIG. 8 illustrates a configuration table in the second embodiment;

FIG. 17 illustrates a configuration table in the third embodiment;

FIG. 21 illustrates a configuration table in the fourth embodiment;

FIG. 24 indicates the arrangement of a DL subframe and a UL subframe in the fifth embodiment;

DESCRIPTION OF EMBODIMENTS

Embodiments will now be described in detail with reference to the accompanying drawings.

(First Embodiment)

Figure 1:
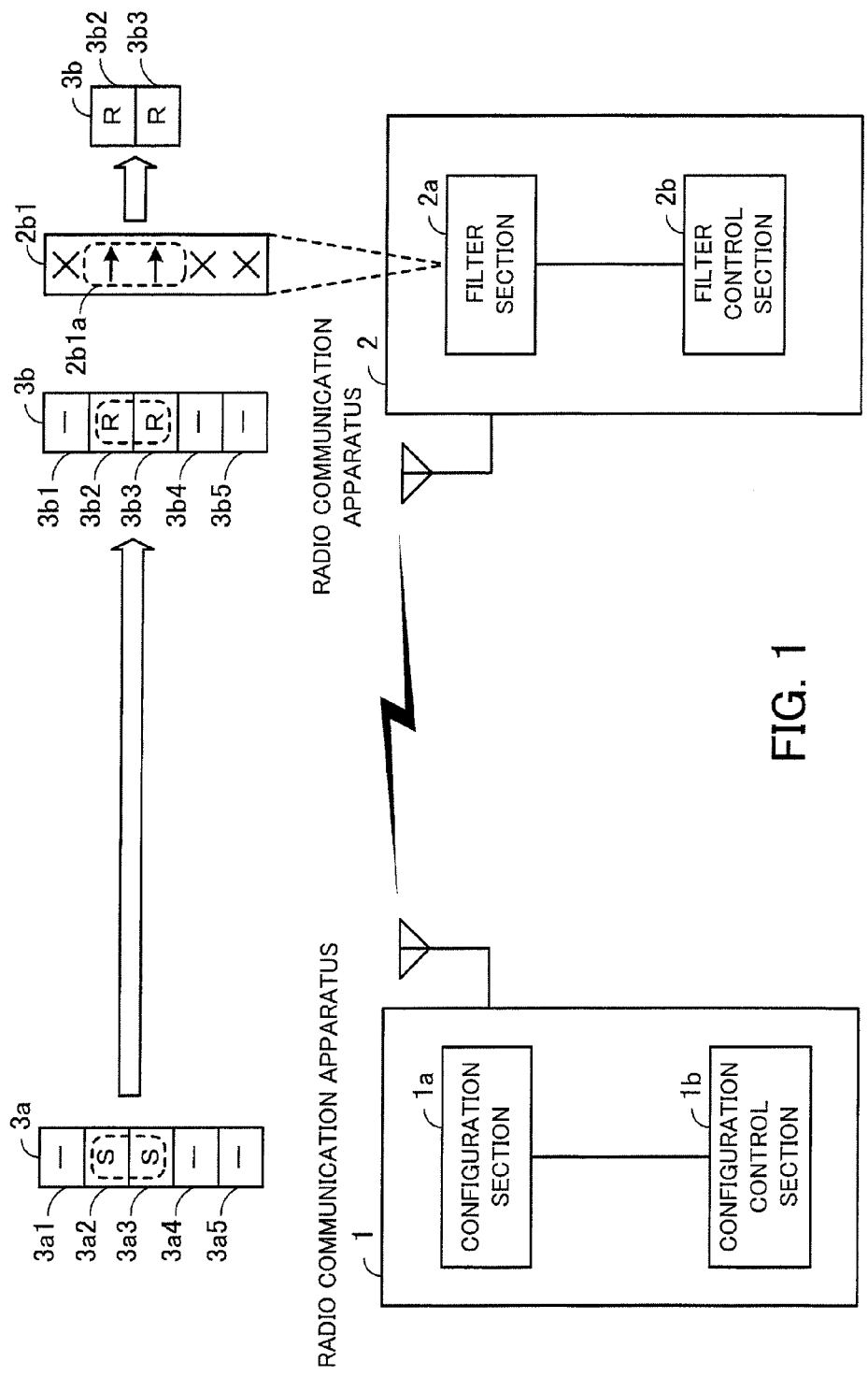
FIG. 1 illustrates a radio communication apparatus according to a first embodiment.

FIG. 1 illustrates a radio communication apparatus according to a first embodiment. As illustrated in FIG. 1, a radio communication apparatus 1 includes a configuration section 1a and a configuration control section 1b. A radio communication apparatus 2 includes a filter section 2a and a filter control section 2b.

The configuration section 1a sets transmission bands (bands 3a2 and 3a3, for example) used for transmitting data from the radio communication apparatus 1 and receiving bands (bands 3a1, 3a4, and 3a5, for example) used for receiving data by the radio communication apparatus 1 in a band group 3a including a plurality of bands.

The configuration control section 1b controls the configuration section 1a so that each of the receiving bands will not be included between the transmission bands (bands 3a2 and 3a3).

It is assumed that the band group 3a includes a plurality of (five, for example) bands each of which is a component carrier, that the band group 3a is transmitted from the radio communication apparatus 1 by radio communication, and that the band group 3a is received by the radio communication apparatus 2 as a band group 3b. In addition, a receiving band interferes with a transmission band. Taking no measures may exercise a bad influence when the radio communication apparatus 2 extracts data in a transmission band.

The radio communication apparatus 2 according to this embodiment uses a filter 2b1 included in the filter section 2a for attenuating a receiving band in the received band group 3b and extracting only a transmission band. By doing so, the radio communication apparatus 2 acquires data transmitted from the radio communication apparatus 1.

The radio communication apparatus 2 receives data by a transmission band transmitted from the radio communication apparatus 1, and transmits data to the radio communication apparatus 1 by transmitting a receiving band.

The filter section 2a includes the filter 2b1 which can extract from the received band group 3b one transmission band or a plurality of transmission bands used for data receiving. In this case, each of the receiving bands (bands 3b1, 3b4, and 3b5) is not included between the plurality of transmission bands. A passing band 2b1a for extracting transmission band (bands 3b2 and 3b3) from the received band group 3b is set in the filter 2b1. The filter 2b1 can change a band extracted on the basis of the passing band 2b1a under the control of the filter control section 2b.

When the filter control section 2b receives the band group 3a which is transmitted from the radio communication apparatus 1 and in which setting is performed so that each of the receiving bands (bands 3b1, 3b4, and 3b5) will not be included between the transmission bands (bands 3b2 and 3b3), the filter control section 2b controls the filter section 2a so as to extract the transmission bands (bands 3b2 and 3b3) from the received band group 3b.

As has been described, the radio communication apparatus 1 does not set a receiving band between any two transmission bands. As a result, transmission bands are lumped together so that they will appear in succession. Furthermore, the filter section 2a of the radio communication apparatus 2 extracts the transmission bands which are used for data receiving, between any two of which a receiving band is not included, and which are lumped together. Accordingly, the transmission bands can be extracted by one filter (filter 2b1). That is to say, the number of analog filters included in the radio communication apparatus 2 can be reduced and the circuit scale of the radio communication apparatus 2 can be reduced.

(Second Embodiment)

A second embodiment will now be described in detail with reference to the accompanying drawings.

FIG. 2 illustrates the entire configuration of a radio communication system according to a second embodiment. A radio communication system illustrated in FIG. 2 includes a base station 100, a mobile station 200, and a core network 10. The base station 100 is connected to the core network 10 and performs radio communication based on, for example, the LTE-A radio communication system with the mobile station 200. The mobile station 200 is, for example, a portable telephone.

Figure 3:
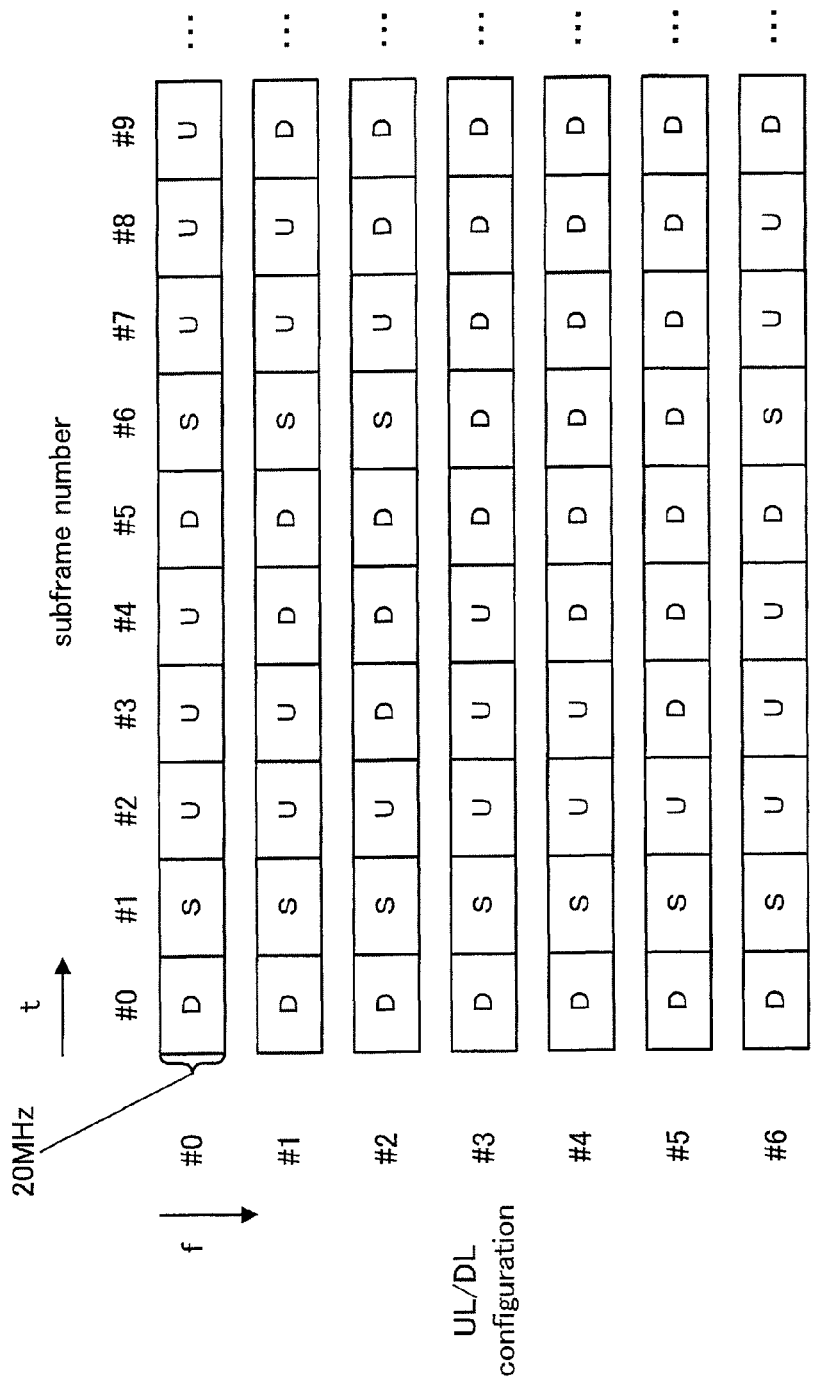
FIG. 3 illustrates subframe setting in the second embodiment.

FIG. 3 illustrates subframe setting in the second embodiment. In this embodiment a TDD system is used and the ratio of UL radio frames to DL radio frames is flexibly controlled. By doing so, the ratio of UL traffic to DL traffic can flexibly be controlled.

With a TDD-LTE system, as illustrated in FIG. 3, UL-DL subframe configurations are defined. In FIG. 3, "D" indicates a DL subframe and "U" indicates a UL subframe. Furthermore, "S" indicates a special subframe in which DLs and ULs mingle and which is described later in detail in FIG. 10.

Each Number indicated in the direction (f) of a vertical axis in FIG. 3 represents a UL-DL configuration which defines the predetermined sequence of UL subframes and DL subframes. In this embodiment any of the UL-DL configurations illustrated in FIG. 3 are selected. The selected UL-DL configurations are used at the same time for forming a component carrier group, and the component carrier group is used for performing one communication.

In addition, each number indicated in the direction (t) of a horizontal axis in FIG. 3 represents a subframe number indicative of the position at each hour of a subframe included in each UL-DL configuration. Subframes are arranged in each UL-DL configuration in time series in accordance with the numbers indicated in the direction of the horizontal axis. Setting is performed so that subframes at the same number in different UL-DL configurations will appear at the same hour in a component carrier group formed. Furthermore, it is assumed that a band of each subframe is 20 MHz. Subframes at the same hour in UL-DL configurations are used in parallel for performing communication in a band the width of which is 20 MHz multiplied by the number of the UL-DL configurations.

A component carrier includes, for example, ten subframes each of which is indicated in a selected UL-DL configuration and is repeated with 10 ms as one cycle. One subframe is 1 ms. In this embodiment UL-DL configurations used as a component carrier group are determined by the base station 100 when communication is established. The base station 100 informs the mobile station 200 of a determined component carrier group. As a result, communication is performed between the base station 100 and the mobile station 200 by the use of the component carrier group of which the base station 100 informs the mobile station 200.

Figure 4:
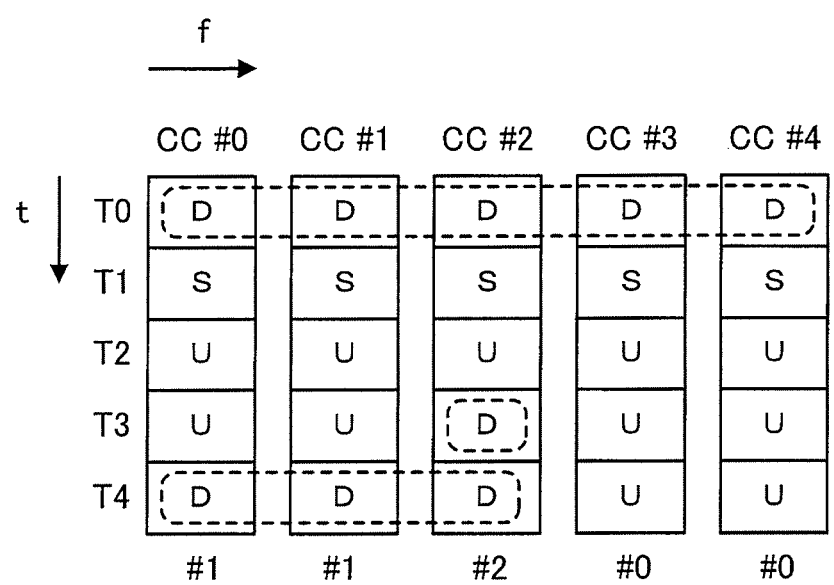
FIG. 4 illustrates the structure of a component carrier group in the second embodiment.

FIG. 4 illustrates the structure of a component carrier group in the second embodiment. Each upper number indicated in the direction (f) of a horizontal axis in FIG. 4 is for identifying a component carrier. Each Number indicated in the direction (t) of a vertical axis in FIG. 4 represents an hour of a subframe included in a component carrier. Hours T0, T1, T2, T3, and T4 are set at equal intervals according to the intervals at which subframes are set. In each component carrier one of a UL subframe, a DL subframe, and a special subframe is set at each of the hours T0, T1, T2, T3, and T4.

Each lower number indicated in FIG. 4 represents a UL-DL configuration set in a component carrier. For example, each component carrier #0 in FIG. 4 indicates that subframes are set in the order indicated by the UL-DL configuration #0 in FIG. 3.

In this embodiment the base station 100 performs setting so that DL subframes at each hour in UL-DL configurations will be lumped together in component carriers. The base station 100 then transmits a DL signal to the mobile station 200 on the basis of the setting.

At the hour T0 in FIG. 4, for example, all the subframes are DL subframes and are lumped together. At the hour T3 only the component carrier #2 includes a DL subframe, so this DL subframe is lumped together. In addition, at the hour T4 only the component carriers #0, #1, and #2 which appear in succession include DL subframes, so these DL subframes are lumped together. Furthermore, at the hour T1 all the subframes are special subframes and are lumped together.

At each hour bands of all DL signal components are made to appear in succession. By doing so, the mobile station 200 can extract the DL signal components in one passing band. That is to say, if the base station 100 transmits a DL signal to the mobile station 200 by the use of a component carrier group like that illustrated in FIG. 4, then receiving-end analog filters in the mobile station 200 can be simplified.

Figure 5:
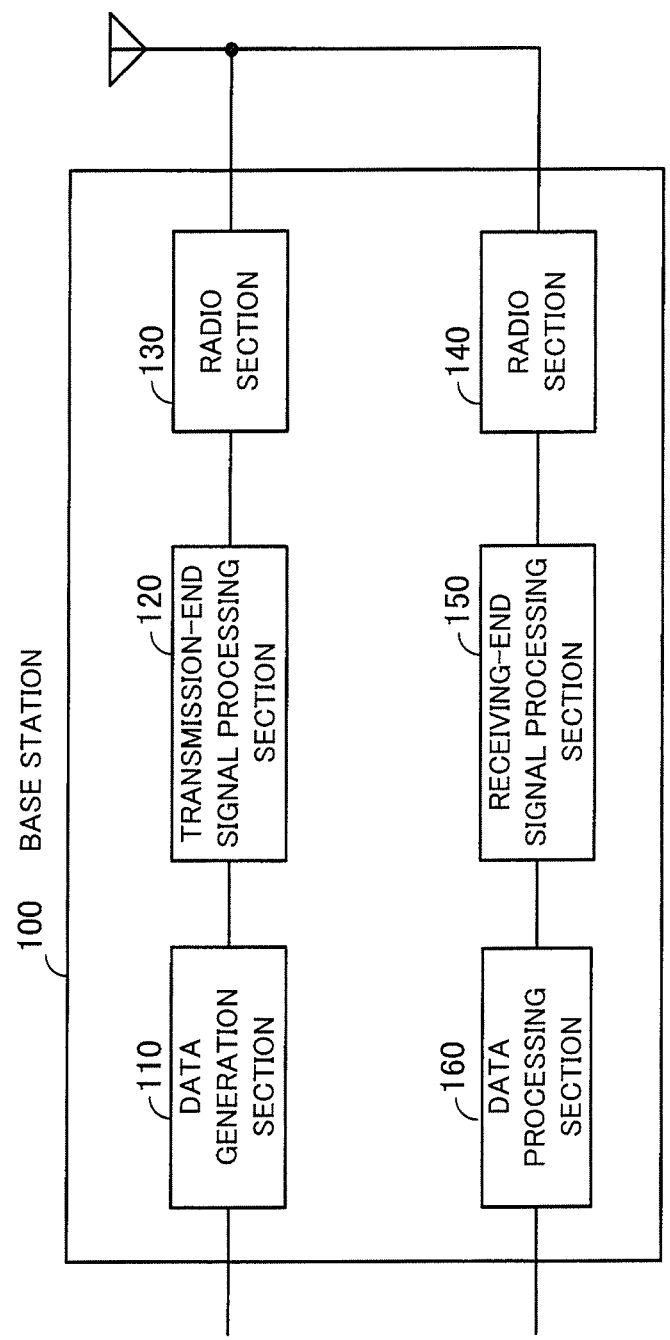
FIG. 5 illustrates the hardware configuration of a base station in the second embodiment.

FIG. 5 illustrates the hardware configuration of the base station in the second embodiment. As illustrated in FIG. 5, the base station 100 includes a data generation section 110, a transmission-end signal processing section 120, radio sections 130 and 140, a receiving-end signal processing section 150, and a data processing section 160.

On the basis of data received from the core network 10, the data generation section 110 generates data to be transmitted to the mobile station 200.

The transmission-end signal processing section 120 performs a process for transmitting the data received from the core network 10 to the mobile station 200. For example, the transmission-end signal processing section 120 subcarrier-modulates the data received from the core network 10. In addition, the transmission-end signal processing section 120 subcarrier-modulates a control channel.

The radio section 130 up-converts a subcarrier-modulated signal outputted from the transmission-end signal processing section 120 to a radio frequency signal and radio-transmits it to the mobile station 200 via an antenna.

The radio section 140 down-converts a signal received from the mobile station 200 via the antenna to a base band signal and outputs it to the receiving-end signal processing section 150.

The receiving-end signal processing section 150 performs a demodulation process on the base band signal obtained as a result of the down-conversion by the radio section 140.

The data processing section 160 transmits via the core network 10 data demodulated by the receiving-end signal processing section 150.

The radio section 130 or 140 is realized by analog circuits, such as an amplifier and a filter. The transmission-end signal processing section 120 or the receiving-end signal processing section 150 is realized by a digital circuit, a DSP (Digital Signal Processor), a CPU (Central Processing Unit), or the like. The data generation section 110 or the data processing section 160 is realized by a CPU or the like.

Figure 6:
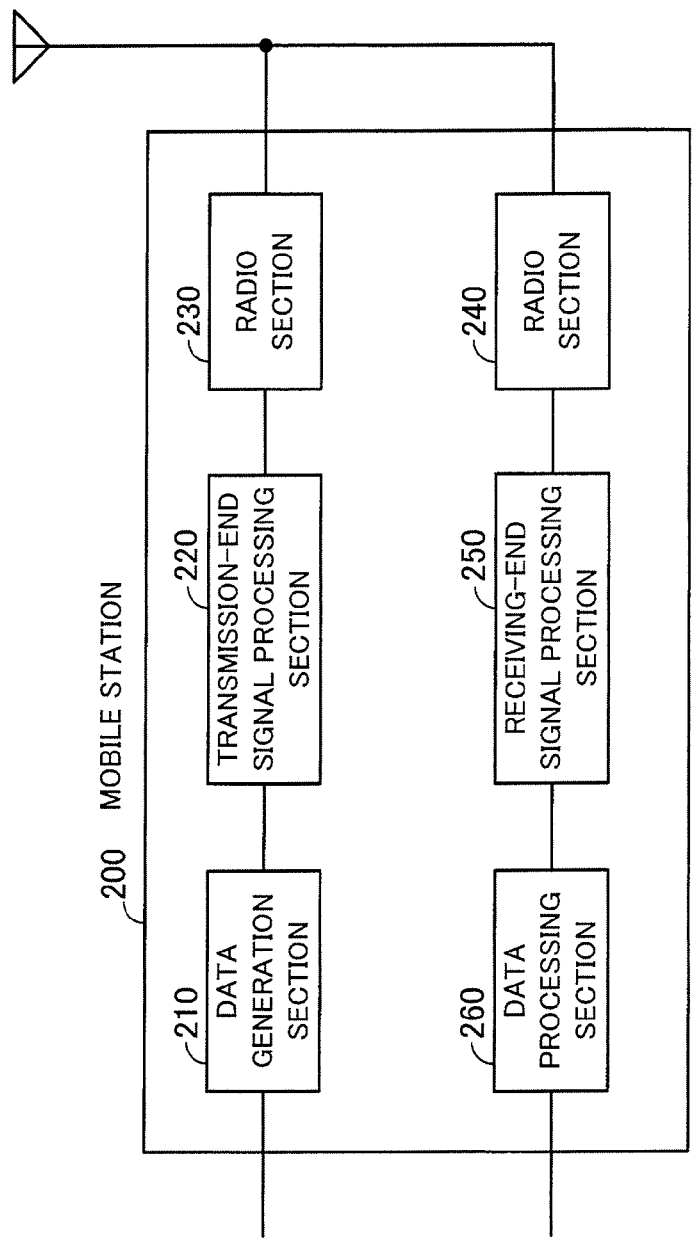
FIG. 6 illustrates the hardware configuration of a mobile station in the second embodiment.

FIG. 6 illustrates the hardware configuration of the mobile station in the second embodiment. As illustrated in FIG. 6, the mobile station 200 includes a data generation section 210, a transmission-end signal processing section 220, radio sections 230 and 240, a receiving-end signal processing section 250, and a data processing section 260.

The data generation section 210 generates data to be transmitted to the base station 100.

The transmission-end signal processing section 220 performs a process for transmitting the data generated by the data generation section 210 to the base station 100. For example, the transmission-end signal processing section 220 subcarrier-modulates the data generated by the data generation section 210. In addition, the transmission-end signal processing section 220 subcarrier-modulates a control channel.

The radio section 230 up-converts a subcarrier-modulated signal outputted from the transmission-end signal processing section 220 to a radio frequency signal and radio-transmits it to the base station 200 via an antenna.

The radio section 240 down-converts a signal received from the base station 100 via the antenna to a base band signal and outputs it to the receiving-end signal processing section 250.

The receiving-end signal processing section 250 performs a demodulation process on the base band signal obtained as a result of the down-conversion by the radio section 240.

The data processing section 260 transmits to an upper layer data demodulated by the receiving-end signal processing section 250.

The radio section 230 or 240 is realized by analog circuits, such as an amplifier and a filter. The transmission-end signal processing section 220 or the receiving-end signal processing section 250 is realized by a digital circuit, a DSP, a CPU, or the like. The data generation section 210 or the data processing section 260 is realized by a CPU or the like.

Figure 7:
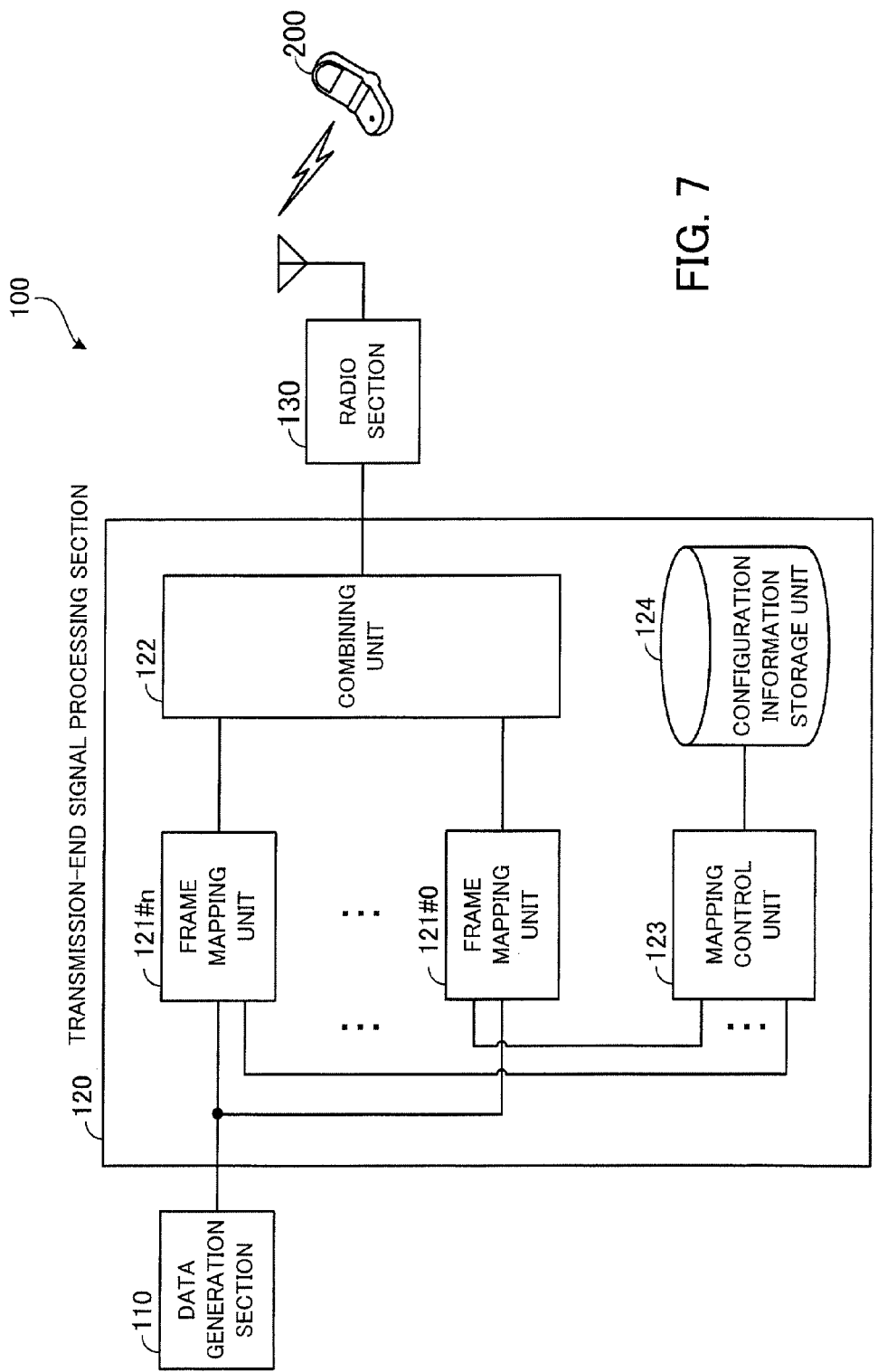
FIG. 7 is a block diagram of a transmission-end signal processing section of the base station in the second embodiment.

FIG. 7 is a block diagram of the transmission-end signal processing section of the base station in the second embodiment. As illustrated in FIG. 7, the base station 100 includes the data generation section 110, the transmission-end signal processing section 120, and the radio section 130.

The transmission-end signal processing section 120 includes frame mapping units 121#0, . . . , and 121#n (n is a number which is one smaller than the number of component carriers included in a component carrier group used for communication, for example), a combining unit 122, a mapping control unit 123, and a configuration information storage unit 124.

The base station 100 in this embodiment controls a UL subframe and a DL subframe in each component carrier included in a component carrier group to be transmitted so that DL subframes will form a successive lump in all component carriers.

On the basis of data received from the core network 10, the data generation section 110 generates transmitted data to be transmitted to the mobile station 200.

The frame mapping units 121#0 through 121#n set DL subframes (transmission bands) used for transmitting data from the base station 100 and UL subframes (receiving bands) used for receiving data by the base station 100 in a component carrier group including a plurality of component carriers. It is assumed that a component carrier group includes a plurality of (five, for example) component carriers, that the component carrier group is transmitted from the base station 100 by radio communication, and that the component carrier group is received by the mobile station 200 as a component carrier group. The frame mapping units 121#0 through 121#n are an example of the configuration section.

The number of the frame mapping units 121#0 through 121#n corresponds to that (five, for example) of the component carriers. The frame mapping units 121#0 through 121#n map transmitted data generated by the data generation section 110 to the component carriers. The frame mapping units 121#0 through 121#n map the transmitted data to the component carriers under the control of the mapping control unit 123 on the basis of whether an hour at that point of time is associated with a DL subframe or a UL subframe. If an hour at that point of time is associated with a DL subframe, then the mapping control unit 123 exercises control so as to map the transmitted data. If an hour at that point of time is associated with a UL subframe, then the mapping control unit 123 exercises control so as not to map the transmitted data.

The combining unit 122 combines the component carriers to which the frame mapping units 121#0 through 121#n map transmitted data and performs subcarrier modulation.

On the basis of configuration information stored in the configuration information storage unit 124, the mapping control unit 123 controls the frame mapping units 121#0 through 121#n so that a UL subframe will not be included between any two DL subframes. The mapping control unit 123 is an example of the configuration control section.

The configuration information storage unit 124 stores configuration information which indicates the association of an hour of the component carrier group used for communication with whether each subframe is a DL subframe or a UL subframe and in which the component carrier group is formed so that a UL subframe will not be included between any two DL subframes.

The radio section 130 up-converts a subcarrier-modulated signal indicative of component carriers combined by the combining unit 122 to a radio frequency signal, and transmits it via the antenna.

In this embodiment the arrangement of DL subframes and UL subframes in each component carrier is set in advance. Configuration information indicative of the set arrangement of DL subframes and UL subframes is stored in advance in the configuration information storage unit 124. DL subframes and UL subframes are set in each component carrier so that a UL subframe will not be included between DL subframes in any component carriers and so that DL subframes will form a successive lump in all component carriers.

The mapping control unit 123 determines on the basis of the configuration information whether a component carrier at an hour is associated with a DL subframe or a UL subframe. If a component carrier at an hour is associated with a DL subframe, then the mapping control unit 123 determines that data can be transmitted by the use of the component carrier at the hour. Accordingly, the mapping control unit 123 informs a frame mapping unit (frame mapping unit 121#0, for example) corresponding to the component carrier that data can be transmitted, that is to say, that transmitted data can be mapped to a radio resource of the component carrier. If a component carrier at an hour is associated with a UL subframe, then data is unable to be transmitted. Accordingly, the mapping control unit 123 gives the frame mapping unit instructions not to map transmitted data to a radio resource of the component carrier at the hour.

FIG. 8 illustrates a configuration table in the second embodiment. A configuration table 124a illustrated in FIG. 8 is stored in the configuration information storage unit 124 included in the base station 100, and indicates the order of subframes set in a component carrier group formed on the basis of control by the mapping control unit 123. The configuration table 124a stores configuration information indicative of the order of subframes in component carriers which make up the component carrier group.

The configuration table 124a includes Hour, CC#0, CC#1, CC#2, CC#3, and CC#4 items. Pieces of information arranged in the horizontal direction under these items are associated with one another as configuration information at the same hour in the configuration table 124a.

Hour indicates an hour at which a DL subframe, a UL subframe, or a special subframe is set in each component carrier.

CC#0, CC#1, CC#2, CC#3, or CC#4 indicates that a subframe at each hour in each component carrier is a DL subframe, a UL subframe, or a special subframe.

If there are DL subframes at each hour in all component carriers in a component carrier group in this embodiment, then setting is performed so that DL subframe bands will appear in succession and so that the DL subframe bands will be lumped together. In addition, if there are special subframes at each hour in all the component carriers, then setting is performed so that special subframe bands will appear in succession and so that the special subframe bands will be lumped together.

In this embodiment one communication is performed by the use of the component carrier group including the five component carriers. However, one communication may be performed by the use of a component carrier group including two to four component carriers or six or more component carriers.

Figure 9:
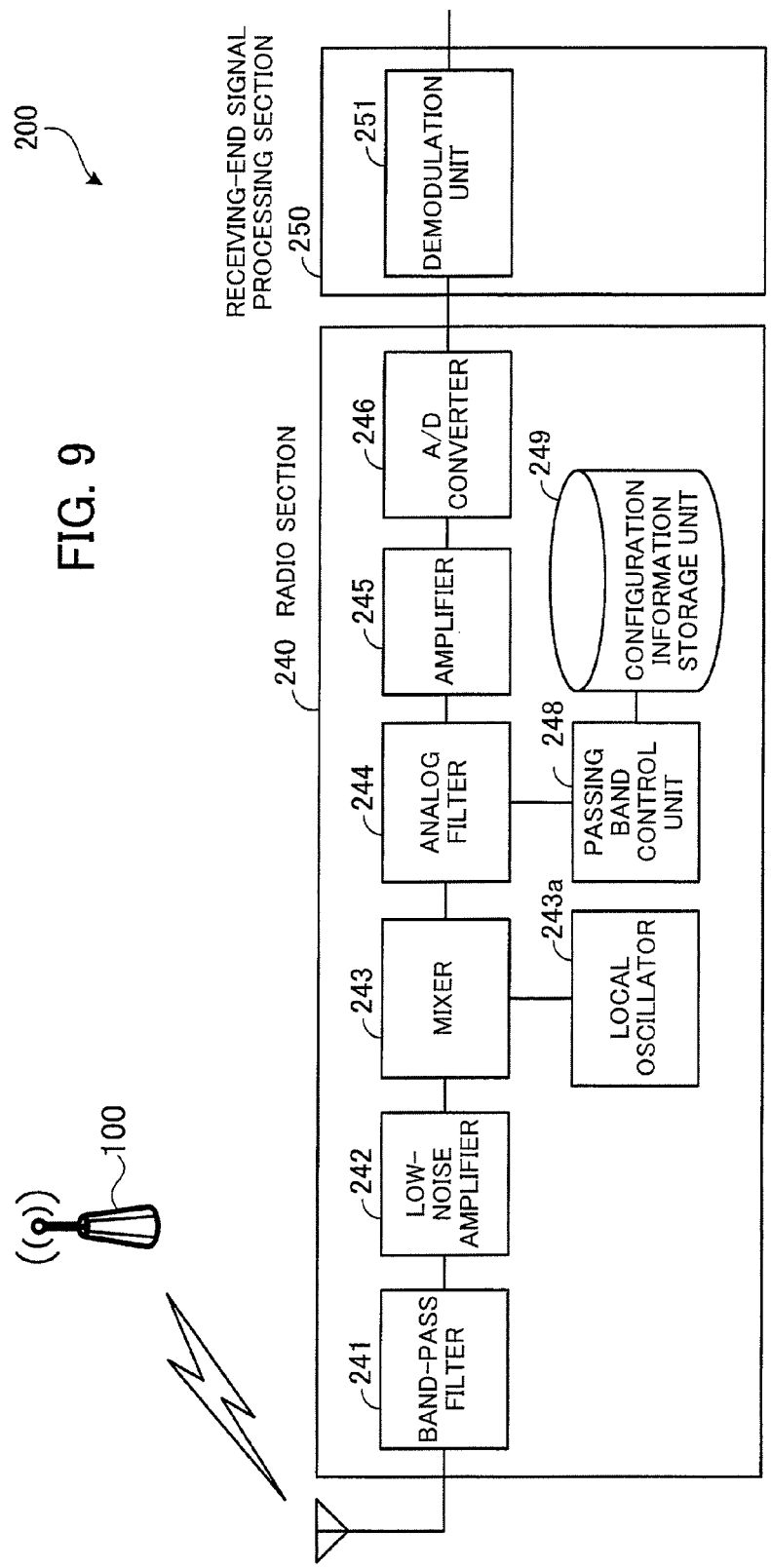
FIG. 9 is a block diagram of a radio section and a receiving-end signal processing section of the mobile station in the second embodiment.

FIG. 9 is a block diagram of the radio section and the receiving-end signal processing section of the mobile station in the second embodiment. As illustrated in FIG. 9, the radio section 240 of the mobile station 200 includes a band-pass filter 241, a low-noise amplifier 242, a mixer 243, a local oscillator 243a, an analog filter 244, an amplifier 245, an A/D (Analog/Digital) converter 246, a passing band control unit 248, and a configuration information storage unit 249. The receiving-end signal processing section 250 includes a demodulation unit 251.

The mobile station 200 in this embodiment receives a component carrier group which includes component carriers each including a DL subframe and a UL subframe and in which DL subframes form a successive lump in all the component carriers as a result of setting by the base station 100, and extracts the DL subframes from the received component carrier group.

The mobile station 200 uses configuration information stored in the configuration information storage unit 249 for extracting the DL subframes from the received component carrier group. By doing so, the mobile station 200 can acquire data transmitted from the base station 100. In this case, the base station 100 transmits the component carrier group in which a UL subframe is not included between any two DL subframes in any component carriers and in which DL subframes form a successive lump in all the component carriers. As a result, the mobile station 200 can extract a plurality of DL subframes set as a successive lump by one analog filter in block. Accordingly, there is no need for the mobile station 200 to include analog filters the number of which corresponds to that of the component carriers used for communication. That is to say, one analog filter will suffice. This makes it possible to reduce the circuit scale of the mobile station 200.

The band-pass filter 241 extracts only a band used for communication from a signal received by the mobile station 200 via the antenna. The low-noise amplifier 242 amplifies a signal in a band extracted by the band-pass filter 241.

The mixer 243 mixes a signal amplified by the low-noise amplifier 242 and a local oscillation signal outputted from the local oscillator 243a. In this embodiment conversion to a base band signal is carried out by a direct conversion system. However, another system, such as a low IF system, may be used.

The local oscillator 243a is an oscillation circuit for frequency conversion and outputs a local oscillation signal a frequency of which is almost the same as the center frequency of DL subframes which are included in a received component carrier group and which form a successive lump at that hour.

Under the control of the passing band control unit 248, the analog filter 244 can extract one DL subframe or a plurality of DL subframes between which a UL subframe is not included. The analog filter 244 can extract from a signal obtained as a result of mixing by the mixer 243 one component carrier band to a maximum of component carrier bands the number of which is the same as that of component carriers used for communication. The analog filter 244 is an example of the filter section.

A DL signal component of a DL subframe is interfered with by a UL signal component of a UL subframe. Therefore, it is assumed that if no measures are taken, the extraction of DL subframe data in the mobile station 200 is badly affected. The mobile station 200 in this embodiment uses the analog filter 244 for attenuating UL subframes included in a received component carrier group and extracting only DL subframes from the received component carrier group. By doing so, the mobile station 200 acquires data transmitted from the base station 100.

The amplifier 245 amplifies a DL signal extracted by the analog filter 244, and outputs an analog signal after the amplification.

The A/D converter 246 converts an analog signal obtained as a result of amplification by the amplifier 245 to a digital signal.

When a component carrier group which is transmitted from the base station 100 and in which setting is performed so that a UL subframe will not be included between any two DL subframes is received, the passing band control unit 248 controls a passing band of the analog filter 244 on the basis of configuration information stored in the configuration information storage unit 249 so as to extract a DL subframe from the received component carrier group. The passing band control unit 248 is an example of the filter control section.

The configuration information storage unit 249 stores configuration information which indicates the association of an hour with whether each subframe is a DL subframe or a UL subframe and in which a component carrier group is formed so that a UL subframe will not be included between any two DL subframes. This is the same with the configuration information storage unit 124. Accordingly, the base station 100 and the mobile station 200 share the same configuration information. As a result, data can be transmitted and received by the use of a component carrier in which a subframe changes with hour.

The demodulation unit 251 outputs data obtained by demodulating a digital signal obtained as a result of conversion by the A/D converter 246. The data outputted from the demodulation unit 251 is processed by the data processing section 260.

In this embodiment the A/D converter 246 included in the radio section 240 converts an analog signal amplified by the amplifier 245 to a digital signal. However, the receiving-end signal processing section 250 may include an A/D converter which converts an analog signal amplified by the amplifier 245 to a digital signal.

Figure 10:
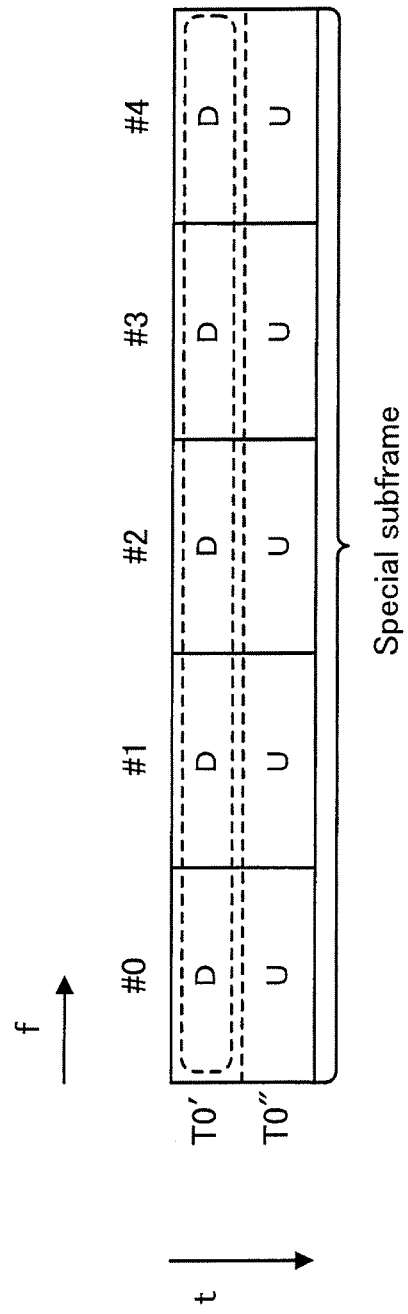
FIG. 10 illustrates a special subframe in the second embodiment.

FIG. 10 illustrates a special subframe in the second embodiment. Each number indicated in the direction (f) of a horizontal axis in FIG. 10 is for identifying a component carrier. Hours T0' and T0" of a special subframe are indicated in the direction (t) of a vertical axis in FIG. 10.

As illustrated in FIG. 10, a special subframe includes both a DL signal component and a UL signal component. It is assumed that all special subframes in this embodiment include only DL signal components at the hour T0' and that all special subframes in this embodiment include only UL signal components at the hour T0" after the hour T0'. As a result, the mobile station 200 in this embodiment can distinguish between DL signal components and UL signal components included in a special subframe and extract only the DL signal components from the special subframe.

Figure 11:
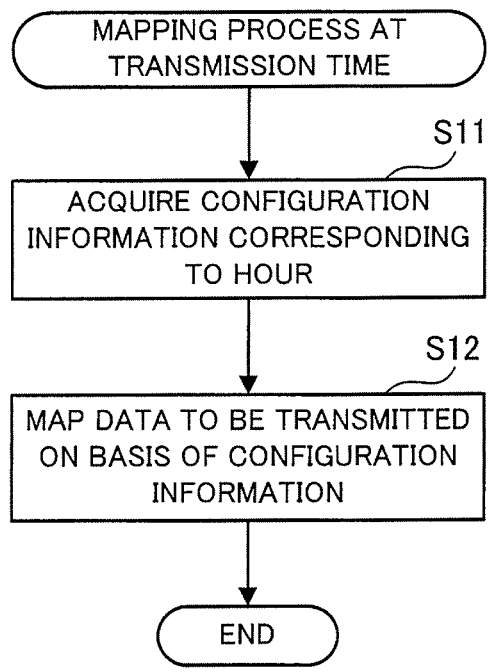
FIG. 11 is a flow chart of a procedure for a mapping process at transmission time in the second embodiment.

FIG. 11 is a flow chart of a procedure for a mapping process at transmission time in the second embodiment.

On the basis of configuration information stored in the configuration information storage unit 124, the base station 100 in this embodiment performs a mapping process at transmission time for mapping data to be transmitted to the mobile station 200. A mapping process at transmission time is begun when data transmitted from the base station 100 is mapped. A mapping process at transmission time indicated in FIG. 11 will now be described in order of step number.

(Step S11) The mapping control unit 123 acquires configuration information corresponding to an hour from the configuration information storage unit 124.

(Step S12) On the basis of the configuration information acquired in step S11, the mapping control unit 123 maps data to be transmitted to the mobile station 200. After that, the process ends.

Figure 12:
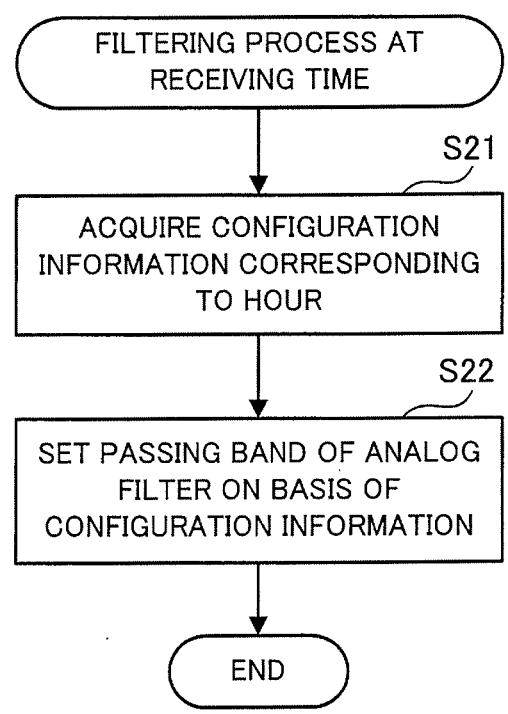
FIG. 12 is a flow chart of a procedure for a filtering process at receiving time in the second embodiment.

FIG. 12 is a flow chart of a procedure for a filtering process at receiving time in the second embodiment. On the basis of configuration information stored in the configuration information storage unit 249, the mobile station 200 in this embodiment performs a filtering process at receiving time for performing filtering at the time of receiving a signal transmitted from the base station 100. A filtering process at receiving time is begun when a signal transmitted from the base station 100 is filtered. A filtering process at receiving time indicated in FIG. 12 will now be described in order of step number.

(Step S21) The passing band control unit 248 acquires configuration information corresponding to an hour from the configuration information storage unit 249.

(Step S22) On the basis of the configuration information acquired in step S21, the passing band control unit 248 sets a passing band of the analog filter 244 so that only DL subframes can be extracted. The base station 100 can extract only DL subframes from a signal transmitted from the mobile station 200 as a result of filtering by the analog filter 244. After that, the process ends.

Figure 13:
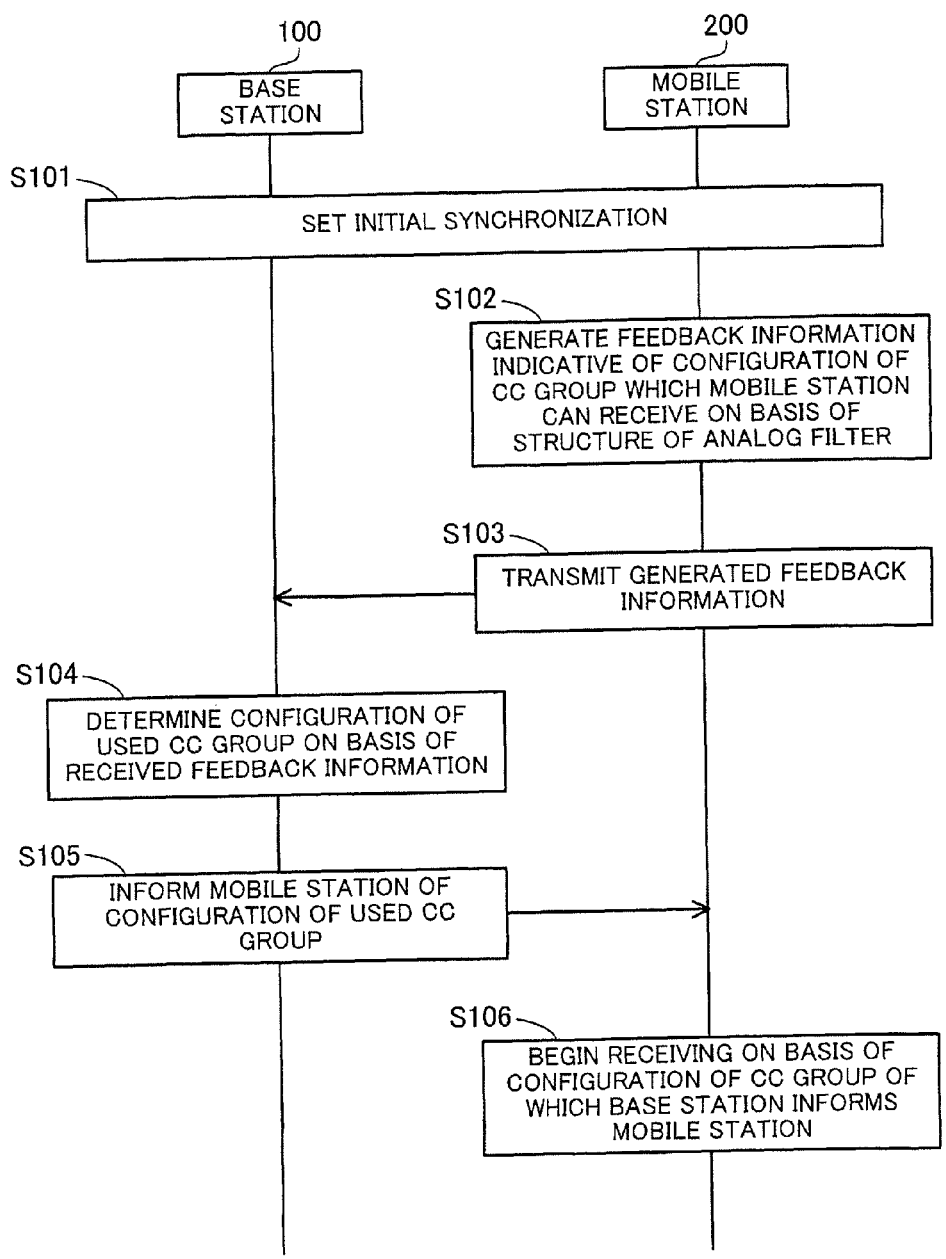
FIG. 13 is a sequence diagram of a procedure at the beginning of communication in the second embodiment.

FIG. 13 is a sequence diagram of a procedure at the beginning of communication in the second embodiment. The base station 100 needs to inform the mobile station 200 of a combination of component carriers included in a component carrier group used for communication.

Feedback information indicative of the configuration of a component carrier group which can be received is transmitted from the mobile station 200 in this embodiment at the beginning of radio communication between the base station 100 and the mobile station 200 after initial synchronization setting is completed.

When the base station 100 receives the feedback information, the base station 100 determines the configuration of a component carrier group used for communication on the basis of the received feedback information and inform the mobile station 200 of the configuration of a component carrier group used for communication. As a result, communication is performed between the base station 100 and the mobile station 200 in accordance with the configuration of a component carrier group of which the base station 100 informs the mobile station 200. A procedure before the beginning of radio communication between the base station 100 and the mobile station 200 will now be described with reference to FIG. 13.

(Step S101) Initial synchronization is set between the base station 100 and the mobile station 200. As a result, initial synchronization, as with LTE, is established for a determined component carrier between the base station 100 and the mobile station 200.

(Step S102) After initial synchronization setting is completed in step S101, the mobile station 200 generates feedback information indicative of the configuration of a component carrier group which the mobile station 200 can receive on the basis of the structure of the analog filter 244 included in the mobile station 200.

(Step S103) The mobile station 200 transmits the feedback information generated in step S102 to the base station 100.

(Step S104) When the base station 100 receives the feedback information transmitted in step S103, the base station 100 determines the configuration of a used component carrier group on the basis of the received feedback information.

(Step S105) The base station 100 informs the mobile station 200 of the configuration of a component carrier group determined in step S104.

(Step S106) The mobile station 200 sets a passing band of the analog filter 244 on the basis of the configuration of a component carrier group of which the base station 100 informs the mobile station 200 in step S105, and begins to receive data transmitted from the base station 100.

As has been described, according to the second embodiment the base station 100 does not set a UL subframe between any two DL subframes in a component carrier group. As a result, DL subframe bands are lumped together and the mobile station 200 can extract DL subframes by the one analog filter 244. That is to say, DL subframes in a component carrier group which form a successive lump can be extracted by one filter. This makes it possible to reduce the number of analog filters used in the mobile station 200 and therefore reduce the circuit scale of the mobile station 200.

(Modification of the Second Embodiment)

A modification of the second embodiment will now be described in detail in detail with reference to the accompanying drawing. In a modification of the second embodiment, a base station 100 performs arrangement so that DL signal components of a DL subframe and a special subframe will appear in succession and so that a UL signal component will not be included between the DL signal components.

Figure 14:
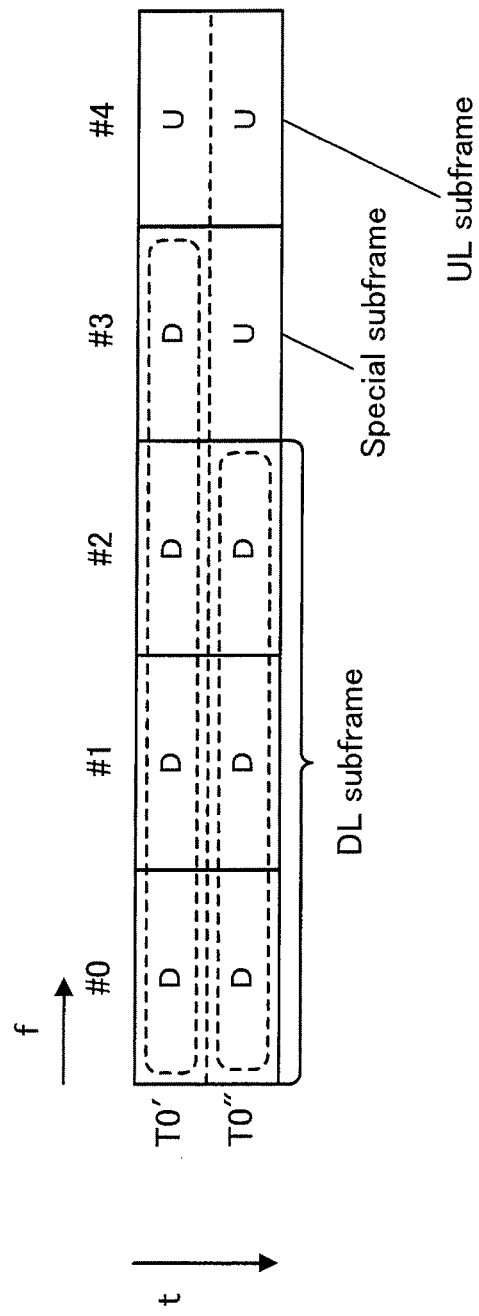
FIG. 14 illustrates a special subframe in a modification of the second embodiment.

FIG. 14 illustrates a special subframe in a modification of the second embodiment. Each number indicated in the direction (f) of a horizontal axis in FIG. 14 is for identifying a component carrier. This is the same with FIG. 10. Hours T0' and T0" of a special subframe are indicated in the direction (t) of a vertical axis in FIG. 14. This is the same with FIG. 10.

As illustrated in FIG. 14, it is assumed that component carriers #0, #1, #2, #3, and #4 are included in a component carrier group used for communication, that a DL subframe is set in the component carriers #0, #1, and #2, that a special subframe is set in the component carrier #3, and that a UL subframe is set in the component carrier #4.

In the component carriers included in the component carrier group used for communication, as illustrated in FIG. 14, the special subframe forms a successive lump. Furthermore, the special subframe lump and all of the plurality of DL subframes are made to appear in succession. By doing so, the component carriers #0 through #3 include DL signal components at an hour T0'. That is to say, all the DL signal components appear in succession at the hour T0'. In addition, the component carriers #0 through #2 include DL signal components at an hour T0". That is to say, all the DL signal components appear in succession at the hour T0".

As has been described, according to the modification of the second embodiment DL signal components of DL subframes and a special subframe appear in succession and are arranged so that a UL signal component will not be included between the DL signal components. This presupposes the second embodiment. As a result, a mobile station 200 can distinguish between DL signal components in special subframes and DL subframes and UL signal components and extract only the DL signal components. Therefore, even if a special subframe and a DL subframe or a UL subframe are set at the same hour, the number of analog filters included in the mobile station 200 can be reduced. That is to say, the circuit scale of the mobile station 200 can be reduced.

(Third Embodiment)

A third embodiment will now be described in detail with reference to the accompanying drawings. The differences between the second embodiment and a third embodiment will mainly be described. The same components are marked with the same numerals and description of them will be omitted. In a third embodiment a base station performs arrangement so that DL subframes will appear in succession and so that they will be at one end of a component carrier group.

Figure 15:
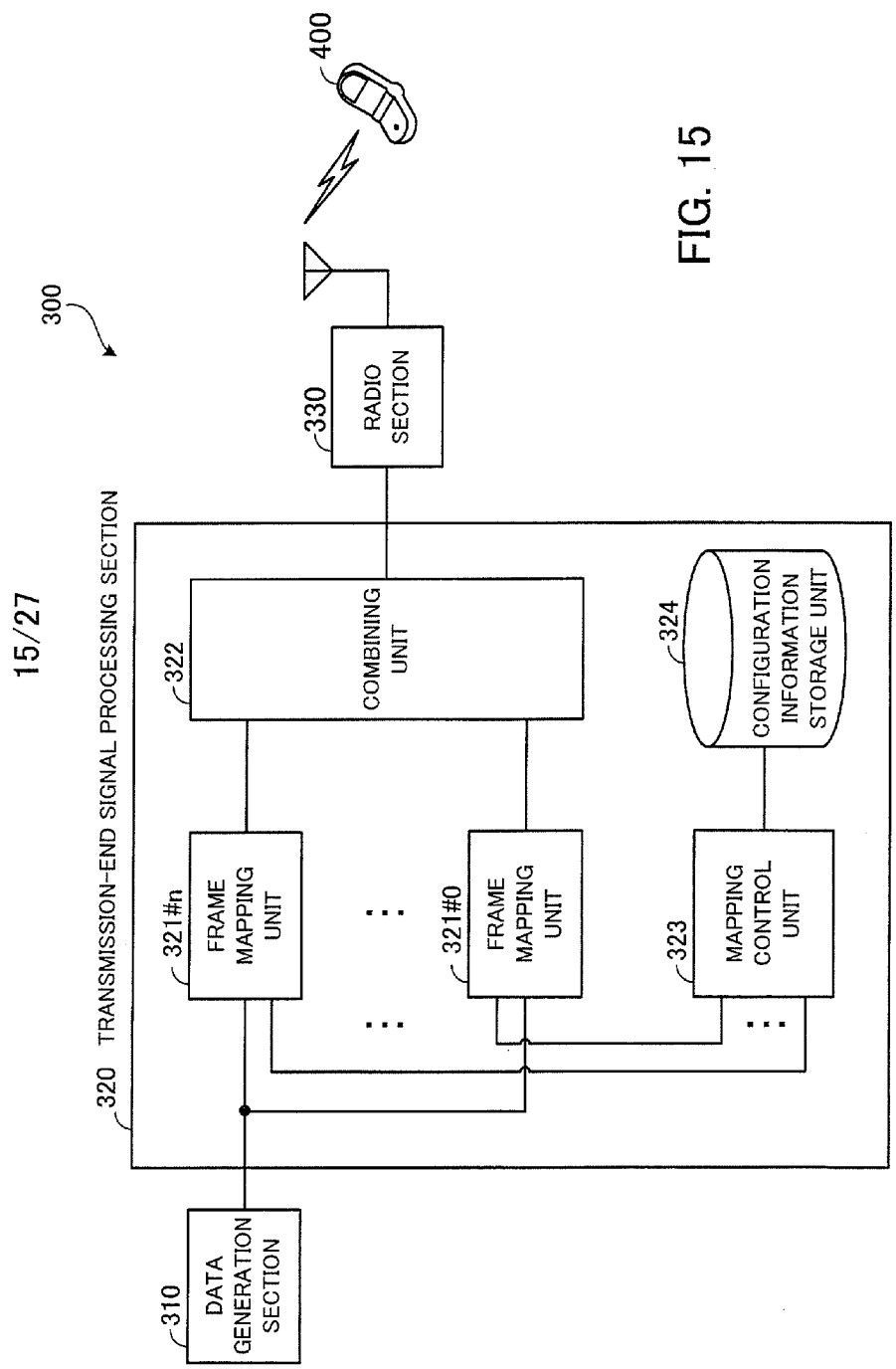
FIG. 15 is a block diagram of a transmission-end signal processing section of a base station in a third embodiment.

FIG. 15 is a block diagram of a transmission-end signal processing section of a base station in a third embodiment. As illustrated in FIG. 15, a base station 300 includes a data generation section 310, a transmission-end signal processing section 320, and a radio section 330. The transmission-end signal processing section 320 includes frame mapping units 321#0, . . . , and 321#n (n is a number which is one smaller than the number of component carriers included in a component carrier group used for communication, for example), a combining unit 322, a mapping control unit 323, and a configuration information storage unit 324. The base station 300 in this embodiment controls a UL subframe and a DL subframe in each component carrier included in a component carrier group to be transmitted so that DL subframes will form a successive lump in all component carriers.

On the basis of data received from a core network 10, the data generation section 310 generates transmitted data to be transmitted to a mobile station 400.

The frame mapping units 321#0 through 321#n set DL subframes (transmission bands) used for transmitting data from the base station 300 and UL subframes (receiving bands) used for receiving data by the base station 300 in a component carrier group including a plurality of component carriers. It is assumed that a component carrier group includes a plurality of (five, for example) component carriers, that the component carrier group is transmitted from the base station 300 by radio communication, and that the component carrier group is received by the mobile station 400 as a component carrier group. The frame mapping units 321#0 through 321#n are an example of the configuration section.

The number of the frame mapping units 321#0 through 321#n corresponds to that (five, for example) of the component carriers. The frame mapping units 321#0 through 321#n map transmitted data generated by the data generation section 310 to the component carriers. The frame mapping units 321#0 through 321#n map the transmitted data to the component carriers under the control of the mapping control unit 323 on the basis of whether an hour at that point of time is associated with a DL subframe or a UL subframe. If an hour at that point of time is associated with a DL subframe, then the mapping control unit 323 exercises control so as to map the transmitted data. If an hour at that point of time is associated with a UL subframe, then the mapping control unit 323 exercises control so as not to map the transmitted data.

The combining unit 322 combines the component carriers to which the frame mapping units 321#0 through 321#n map transmitted data and performs subcarrier modulation.

On the basis of configuration information stored in the configuration information storage unit 324, the mapping control unit 323 controls the frame mapping units 321#0 through 321#n so that a UL subframe will not be set in a frequency band in the component carrier group in which frequencies are lower than or equal to the frequencies of DL subframes (or higher than or equal to the frequencies of DL subframes). By doing so, DL subframe are arranged at one end (on a low frequency side, for example) of the component carrier group and UL subframe are arranged at the other end (on a high frequency side, for example) of the component carrier group. The mapping control unit 323 is an example of the configuration control section.

Accordingly, the mapping control unit 323 controls the frame mapping units 321#0 through 321#n so that a DL sunframe will not be included between any two UL subframes in the component carrier group.

In this embodiment DL subframe are arranged on the low frequency side of the component carrier group and UL subframe are arranged on the high frequency side of the component carrier group. However, DL subframe may be arranged on the high frequency side of the component carrier group and UL subframe may be arranged on the low frequency side of the component carrier group.

The configuration information storage unit 324 stores configuration information which indicates the association of an hour of the component carrier group used for communication with whether each subframe is a DL subframe or a UL subframe and in which the component carrier group is formed so that a UL subframe will not be included between any two DL subframes. In addition, the configuration information in this embodiment is set so that DL subframe will be arranged at one end of the component carrier group and so that UL subframe will be arranged at the other end of the component carrier group.

The radio section 330 up-converts a subcarrier-modulated signal indicative of component carriers combined by the combining unit 322 to a radio frequency signal, and transmits it via an antenna.

In this embodiment the arrangement of DL subframes and UL subframes in each component carrier is set in advance. Configuration information indicative of the set arrangement of DL subframes and UL subframes is stored in advance in the configuration information storage unit 324. DL subframes and UL subframes are set in each component carrier so that a UL subframe will not be included between DL subframes in any component carriers and so that DL subframes will form a successive lump in all component carriers.

The mapping control unit 323 determines on the basis of the configuration information whether a component carrier at an hour is associated with a DL subframe or a UL subframe. If a component carrier at an hour is associated with a DL subframe, then the mapping control unit 323 determines that data can be transmitted by the use of the component carrier at the hour. Accordingly, the mapping control unit 323 informs a frame mapping unit (frame mapping unit 321#0, for example) corresponding to the component carrier that data can be transmitted, that is to say, that transmitted data can be mapped to a radio resource of the component carrier. If a component carrier at an hour is associated with a UL subframe, then data is unable to be transmitted. Accordingly, the mapping control unit 323 gives the frame mapping unit instructions not to map transmitted data to a radio resource of the component carrier at the hour.

Furthermore, the structure of the receiving-end signal processing section of the mobile station 400 is the same as that of the receiving-end signal processing section 250 included in the mobile station 200 in the second embodiment described above in FIG. 9. Description of the receiving-end signal processing section included in the mobile station 400 will be omitted. The mobile station 400 can extract DL subframe signals included in a component carrier group transmitted from the base station 300 by one analog filter.

In addition, the structure of the transmission-end signal processing section of the mobile station 400 is the same as that of the transmission-end signal processing section 320 included in the base station 300 in this embodiment. Description of the transmission-end signal processing section included in the mobile station 400 will be omitted. The mobile station 400 can transmit to the base station 300 a signal in which transmitted data is mapped to UL subframes arranged in the same way in a component carrier group on the basis of configuration information.

Moreover, the structure of the receiving-end signal processing section of the base station 300 is the same as that of the receiving-end signal processing section 250 included in the mobile station 200 in the second embodiment described above in FIG. 9. Description of the receiving-end signal processing section included in the base station 300 will be omitted. The base station 300 can extract UL subframe signals transmitted from the mobile station 400 by one analog filter.

Figure 16:
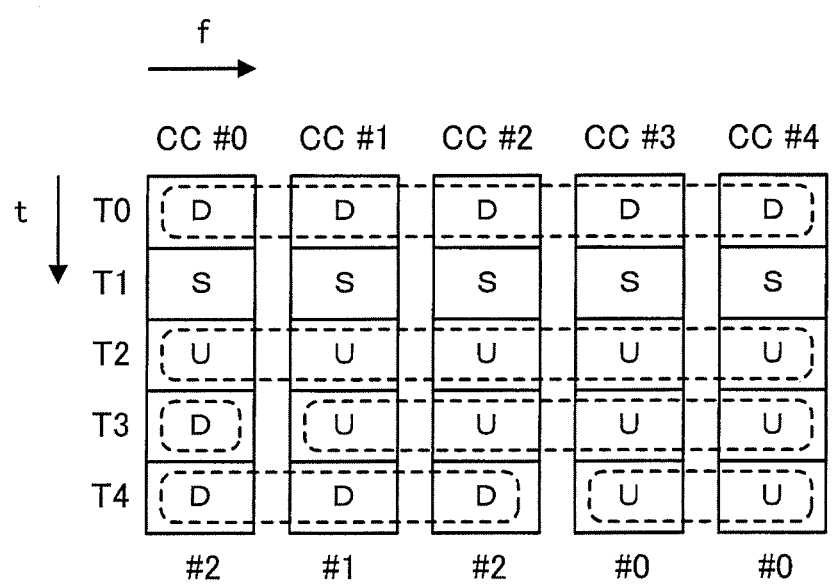
FIG. 16 illustrates the structure of a component carrier group in the third embodiment.

FIG. 16 illustrates the structure of a component carrier group in the third embodiment. Each upper number indicated in the direction (f) of a horizontal axis in FIG. 16 is for identifying a component carrier. Each Number indicated in the direction (t) of a vertical axis in FIG. 16 represents an hour of a subframe included in a component carrier. Hours T0, T1, T2, T3, and T4 are set at equal intervals according to the intervals at which subframes are set. In each component carrier one of a UL subframe, a DL subframe, and a special subframe is set at each of the hours T0, T1, T2, T3, and T4.

Each lower number indicated in FIG. 16 represents a UL-DL configuration set in a component carrier.

In this embodiment the base station 300 performs setting so that DL subframes at each hour in UL-DL configurations will be on a low frequency, or left-hand, side in component carriers and so that they will be lumped together in the component carriers. The base station 300 then transmits a DL signal to the mobile station 400 on the basis of the setting.

At the hour T0 in FIG. 16, for example, all the subframes are DL subframes and are lumped together. At the hour T2, all the subframes are UL subframes and are lumped together. At the hour T3, only the component carrier #0 includes a DL subframe and this DL subframe is lumped together on the left-hand side. In addition, the component carriers #1, #2, #3, and #4 include UL subframes and these UL subframes are lumped together on the right-hand side. Furthermore, at the hour T4 the component carriers #0, #1, and #2 include DL subframes and these DL subframes are lumped together on the left-hand side. The component carriers #3 and #4 include UL subframes and these UL subframes are lumped together on the right-hand side. Moreover, at the hour T1 all the subframes are special subframes and are lumped together.

In this embodiment at each hour all DL signal component bands and all UL signal component bands are arranged at the ends of a component carrier group so that they will appear in succession. This enables the base station 300 to extract UL signal components in one passing region, and enables the mobile station 400 to extract DL signal components in one passing region.

FIG. 17 illustrates a configuration table in the third embodiment. A configuration table 324a illustrated in FIG. 17 is stored in the configuration information storage unit 324 included in the base station 300, and indicates the order of subframes set in a component carrier group formed on the basis of control by the mapping control unit 323. The configuration table 324a stores configuration information indicative of the order of subframes in component carriers which make up the component carrier group.

If there are DL subframes at each hour in all component carriers in the configuration table 324a in this embodiment, then DL subframe bands are arranged at one end (on the left-hand side, for example), appear in succession, and are lumped together. Furthermore, if there are UL subframes, then UL subframe bands are arranged at the other end (on the right-hand side, for example), appear in succession, and are lumped together. In addition, if there are special subframes at each hour in all the component carriers, then special subframe bands appear in succession and are lumped together.

In this embodiment one communication is performed by the use of the component carrier group including the five component carriers. However, one communication may be performed by the use of a component carrier group including two to four component carriers or six or more component carriers.

As has been described, according to the third embodiment DL subframes are arranged at one end (on the low frequency, or left-hand, side or on the high frequency, or right-hand, side) of a component carrier group with the second embodiment as a premise. By doing so, DL subframes or UL subframes in the component carrier group can be treated as a successive lump. Therefore, one analog filter is sufficient for the mobile station 400 to extract DL subframe bands lumped together. Similarly, one analog filter is sufficient for the base station 300 to extract UL subframe bands which appear in succession. As a result, the number of analog filters can be reduced for both of the DL and the UL and the circuit scale of the base station 300 and the mobile station 400 can be reduced.

(Fourth Embodiment)

A fourth embodiment will now be described in detail with reference to the accompanying drawings. The differences between the second embodiment and a fourth embodiment will mainly be described. The same components are marked with the same numerals and description of them will be omitted. In a fourth embodiment a base station 500 performs arrangement so that DL subframes will appear in succession and so that they will gather in the center of a component carrier group.

Figure 18:
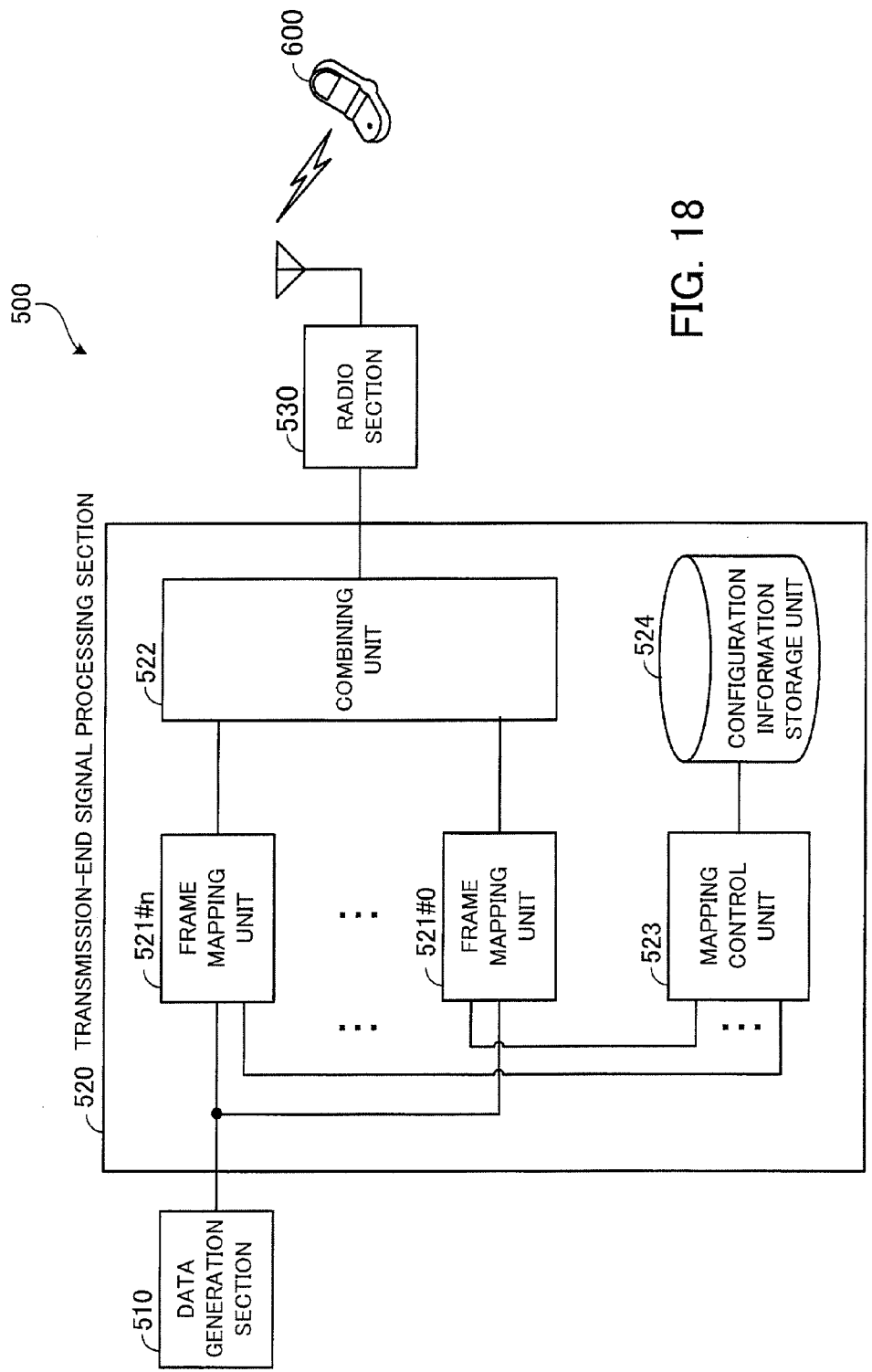
FIG. 18 is a block diagram of a transmission-end signal processing section of a base station in a fourth embodiment.

FIG. 18 is a block diagram of a transmission-end signal processing section of a base station in a fourth embodiment. As illustrated in FIG. 18, a base station 500 includes a data generation section 510, a transmission-end signal processing section 520, and a radio section 530. The transmission-end signal processing section 520 includes frame mapping units 521#0, . . . , and 521#n (n is a number which is one smaller than the number of component carriers included in a component carrier group used for communication, for example), a combining unit 522, a mapping control unit 523, and a configuration information storage unit 524. The base station 500 in this embodiment controls a UL subframe and a DL subframe in each component carrier included in a component carrier group to be transmitted so that DL subframes will form a successive lump in all component carriers.

On the basis of data received from a core network 10, the data generation section 510 generates transmitted data to be transmitted to a mobile station 600.

The frame mapping units 521#0 through 521#n set DL subframes (transmission bands) used for transmitting data from the base station 500 and UL subframes (receiving bands) used for receiving data by the base station 500 in a component carrier group including a plurality of component carriers. It is assumed that a component carrier group includes a plurality of (five, for example) component carriers, that the component carrier group is transmitted from the base station 500 by radio communication, and that the component carrier group is received by the mobile station 600 as a component carrier group.

The number of the frame mapping units 521#0 through 521#n corresponds to that (five, for example) of the component carriers. The frame mapping units 521#0 through 521#n map transmitted data generated by the data generation section 510 to the component carriers. The frame mapping units 521#0 through 521#n map the transmitted data to the component carriers under the control of the mapping control unit 523 on the basis of whether an hour at that point of time is associated with a DL subframe or a UL subframe. If an hour at that point of time is associated with a DL subframe, then the mapping control unit 523 exercises control so as to map the transmitted data. If an hour at that point of time is associated with a UL subframe, then the mapping control unit 523 exercises control so as not to map the transmitted data. The frame mapping units 521#0 through 521#n are an example of the configuration section.

The combining unit 522 combines the component carriers to which the frame mapping units 521#0 through 521#n map transmitted data and performs subcarrier modulation.

On the basis of configuration information stored in the configuration information storage unit 524, the mapping control unit 523 controls the frame mapping units 521#0 through 521#n so that DL subframes will be lumped together, so that a UL subframe will not be set between any two DL subframes, and so that a central DL subframe of the DL subframes will be set so as to be nearest the center of a component carrier group. The mapping control unit 523 is an example of the configuration control section.

The configuration information storage unit 524 stores configuration information which indicates the association of an hour of the component carrier group used for communication with whether each subframe is a DL subframe or a UL subframe and in which the component carrier group is formed so that a UL subframe will not be included between any two DL subframes.

The radio section 530 up-converts a subcarrier-modulated signal indicative of component carriers combined by the combining unit 522 to a radio frequency signal, and transmits it via an antenna.

In this embodiment the arrangement of DL subframes and UL subframes in each component carrier is set in advance. Configuration information indicative of the set arrangement of DL subframes and UL subframes is stored in advance in the configuration information storage unit 524. DL subframes and UL subframes are set in each component carrier so that a UL subframe will not be included between DL subframes in any component carriers and so that DL subframes will form a successive lump in all component carriers.

The mapping control unit 523 determines on the basis of the configuration information whether a component carrier at an hour is associated with a DL subframe or a UL subframe. If a component carrier at an hour is associated with a DL subframe, then the mapping control unit 523 determines that data can be transmitted by the use of the component carrier at the hour. Accordingly, the mapping control unit 523 informs a frame mapping unit (frame mapping unit 521#0, for example) corresponding to the component carrier that data can be transmitted, that is to say, that transmitted data can be mapped to a radio resource of the component carrier. If a component carrier at an hour is associated with a UL subframe, then data is unable to be transmitted. Accordingly, the mapping control unit 523 gives the frame mapping unit instructions not to map transmitted data to a radio resource of the component carrier at the hour.

Figure 19:
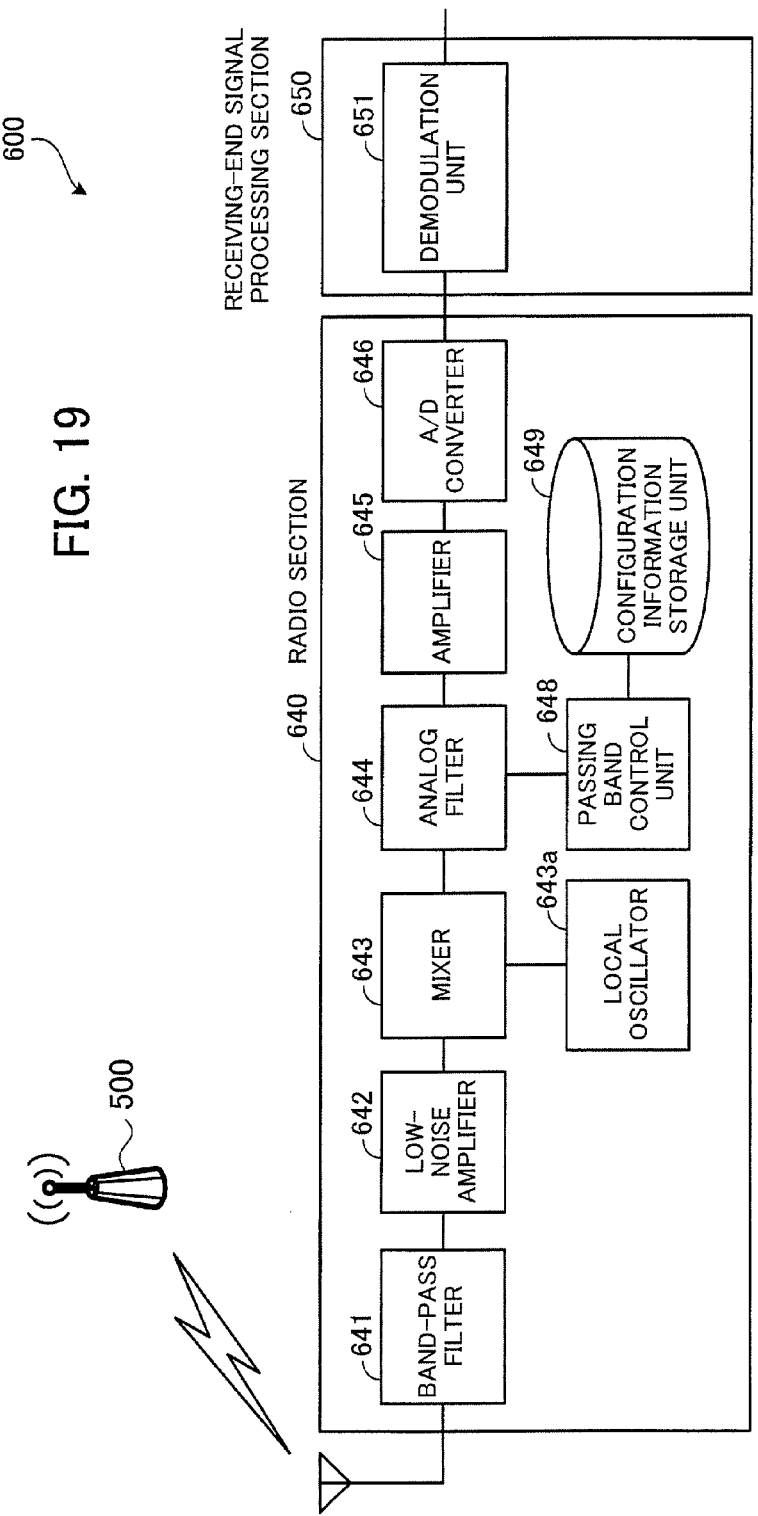
FIG. 19 is a block diagram of a radio section and a receiving-end signal processing section of a mobile station in the fourth embodiment.

FIG. 19 is a block diagram of a radio section and a receiving-end signal processing section of a mobile station in the fourth embodiment. As illustrated in FIG. 19, the radio section 640 of the mobile station 600 includes a band-pass filter 641, a low-noise amplifier 642, a mixer 643, a local oscillator 643a, an analog filter 644, an amplifier 645, an A/D converter 646, a passing band control unit 648, and a configuration information storage unit 649. A receiving-end signal processing section 650 includes a demodulation unit 651.

The mobile station 600 in this embodiment receives a component carrier group which includes component carriers each including a DL subframe and a UL subframe and in which DL subframes form a successive lump in all the component carriers as a result of setting by the base station 500, and extracts the DL subframes from the received component carrier group.

The mobile station 600 uses configuration information stored in the configuration information storage unit 649 for extracting the DL subframes from the received component carrier group. By doing so, the mobile station 600 can acquire data transmitted from the base station 500. In this case, the base station 500 transmits the component carrier group in which a UL subframe is not included between any two DL subframes in any component carriers and in which DL subframes form a successive lump in all the component carriers. As a result, the mobile station 600 can extract a plurality of DL subframes set as a successive lump by one analog filter in block. Accordingly, there is no need for the mobile station 600 to include analog filters the number of which corresponds to that of the component carriers used for communication. That is to say, one analog filter will suffice. This makes it possible to reduce the circuit scale of the mobile station 600.

The band-pass filter 641 extracts only a band used for communication from a signal received by the mobile station 600 via an antenna. The low-noise amplifier 642 amplifies a signal in a band extracted by the band-pass filter 641.

The mixer 643 mixes a signal amplified by the low-noise amplifier 642 and a local oscillation signal outputted from the local oscillator 643a. In this embodiment conversion to a base band signal is carried out by a direct conversion system. However, another system, such as a low IF system, may be used.

The local oscillator 643a is an oscillation circuit for frequency conversion and outputs a local oscillation signal the frequency of which is almost the same as the center frequency of DL subframes which are included in a received component carrier group and which form a successive lump at that hour. In this embodiment DL subframes are set in the center of the received component carrier group and the center frequency of the DL subframes does not vary with time. Accordingly, the local oscillator 643a need not change the frequency of a local oscillation signal and can output a local oscillation signal at a constant frequency.

Under the control of the passing band control unit 648, the analog filter 644 can extract one DL subframe or a plurality of DL subframes between which a UL subframe is not included. The analog filter 644 can extract from a signal obtained as a result of mixing by the mixer 643 one component carrier band to a maximum of component carrier bands the number of which is the same as that of component carriers used for communication. The analog filter 644 is an example of the filter section.

A DL signal component of a DL subframe is interfered with by a UL signal component of a UL subframe. Therefore, it is assumed that if no measures are taken, the extraction of DL subframe data in the mobile station 600 is badly affected. The mobile station 600 in this embodiment uses the analog filter 644 for attenuating UL subframes included in a received component carrier group and extracting only DL subframes from the received component carrier group. By doing so, the mobile station 600 acquires data transmitted from the base station 500.

The amplifier 645 amplifies a DL signal extracted by the analog filter 644, and outputs an analog signal after the amplification.

The A/D converter 646 converts an analog signal obtained as a result of amplification by the amplifier 645 to a digital signal.

When a component carrier group which is transmitted from the base station 500 and in which setting is performed so that a UL subframe will not be included between any two DL subframes is received, the passing band control unit 648 controls a passing band of the analog filter 644 on the basis of configuration information stored in the configuration information storage unit 649 so as to extract a DL subframe from the received component carrier group. The passing band control unit 648 is an example of the filter control section.

The configuration information storage unit 649 stores configuration information which indicates the association of an hour with whether each subframe is a DL subframe or a UL subframe and in which a component carrier group is formed so that a UL subframe will not be included between any two DL subframes. This is the same with the configuration information storage unit 524. Accordingly, the base station 500 and the mobile station 600 share the same configuration information. As a result, data can be transmitted and received by the use of a component carrier in which a subframe changes with hour.

The demodulation unit 651 outputs data obtained by demodulating a digital signal obtained as a result of conversion by the A/D converter 646. The data outputted from the demodulation unit 651 is processed by a data processing section (not illustrated) included in the mobile station 600.

In this embodiment UL-DL configurations are set so that DL subframes will form a successive lump in all component carriers and so that the center frequency of DL subframes will be at the center of all the component carriers.

As a result, the frequency of a local oscillation signal outputted from the local oscillator 643a included in the mobile station 600 is not changed and can be made constant. Usually switching a frequency of a local oscillation signal outputted from a local oscillator to another frequency takes convergence time. This may cause distortion of a received signal and degradation in receiving performance. In this embodiment, however, DL subframes lumped together are arranged left-right symmetrically in the center of a component carrier group in order to avoid this problem. That is to say, the base station sets UL-DL configurations which make a change in the frequency of a local oscillation signal outputted from the local oscillator 643a included in the mobile station 600 unnecessary.

The number of component carriers is set so that they will be left-right symmetrical with respect to the frequency of a local oscillation signal outputted from the local oscillator 643a.

Furthermore, in this embodiment the A/D converter 646 included in the radio section 640 converts an analog signal amplified by the amplifier 645 to a digital signal. However, the receiving-end signal processing section 650 may include an A/D converter which converts an analog signal amplified by the amplifier 645 to a digital signal.

Figure 20:
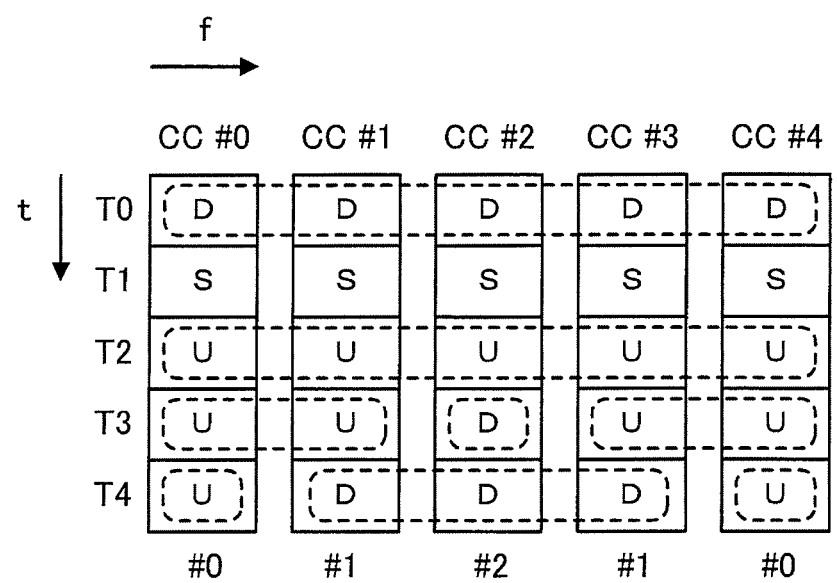
FIG. 20 illustrates the structure of a component carrier group in the fourth embodiment.

FIG. 20 illustrates the structure of a component carrier group in the fourth embodiment. Each upper number indicated in the direction (f) of a horizontal axis in FIG. 20 is for identifying a component carrier. Each Number indicated in the direction (t) of a vertical axis in FIG. 20 represents an hour of a subframe included in a component carrier. Hours T0, T1, T2, T3, and T4 are set at equal intervals according to the intervals at which subframes are set. In each component carrier one of a UL subframe, a DL subframe, and a special subframe is set at each of the hours T0, T1, T2, T3, and T4.

Each lower number indicated in FIG. 20 represents a UL-DL configuration set in a component carrier.

In this embodiment the base station 500 performs setting so that a central DL subframe of DL subframes lumped together at each hour in UL-DL configurations will be in the center of a component carrier group. The base station 500 then transmits a DL signal to the mobile station 600 on the basis of the setting.

At the hour T0 in FIG. 20, for example, all the subframes are DL subframes and are lumped together. At the hour T2, all the subframes are UL subframes and are lumped together. At the hour T3, only the component carrier #2 includes a DL subframe and this DL subframe is lumped together in the center of the component carrier group. Furthermore, at the hour T4 the component carriers #1, #2, and #3 include DL subframes and these DL subframes are lumped together in the center of the component carrier group. In addition, at the hour T1 all the subframes are special subframes and are lumped together. In this embodiment at each hour all DL signal component bands are arranged in the center of a component carrier group so that they will appear in succession. This enables the mobile station 600 to extract DL signal components in one passing region. In addition, the center frequency of DL subframes lumped together is constant and the frequency of a local oscillation signal can be made constant.

FIG. 21 illustrates a configuration table in the fourth embodiment. A configuration table 524a illustrated in FIG. 21 is stored in the configuration information storage unit 524 included in the base station 500, and indicates the order of subframes set in a component carrier group formed on the basis of control by the mapping control unit 523. The configuration table 524a stores configuration information indicative of the order of subframes in component carriers which make up the component carrier group.

If there are DL subframes at each hour in all component carriers in the configuration table 524a in this embodiment, then DL subframe bands appear in succession and are arranged in the center of a component carrier group. In addition, if there are special subframes at each hour in all the component carriers, then special subframe bands appear in succession and are lumped together.

In this embodiment one communication is performed by the use of the component carrier group including the five component carriers. However, one communication may be performed by the use of a component carrier group including two to four component carriers or six or more component carriers.

As has been described, according to the fourth embodiment DL subframes lumped together are arranged in the center of a component carrier group with the second embodiment as a premise. As a result, the DL subframes lumped together can be extracted by one analog filter. Accordingly, the circuit scale of the mobile station 600 can be reduced. In addition, the DL subframes are arranged left-right symmetrically in the center of a component carrier group. Accordingly, there is no need to change the frequency of a local oscillation signal outputted from the local oscillator 643a included in the mobile station 600. As a result, the circuit scale of the mobile station 600 can be reduced.

(Fifth Embodiment)

A fifth embodiment will now be described in detail with reference to the accompanying drawings. The differences between the second embodiment and a fifth embodiment will mainly be described. The same components are marked with the same numerals and description of them will be omitted. In a fifth embodiment a base station acquires from a mobile station information indicative of the number of component carriers which the mobile station can receive. The base station performs communication by arranging component carriers which the mobile station can receive on the basis of the information acquired.

Figure 22:
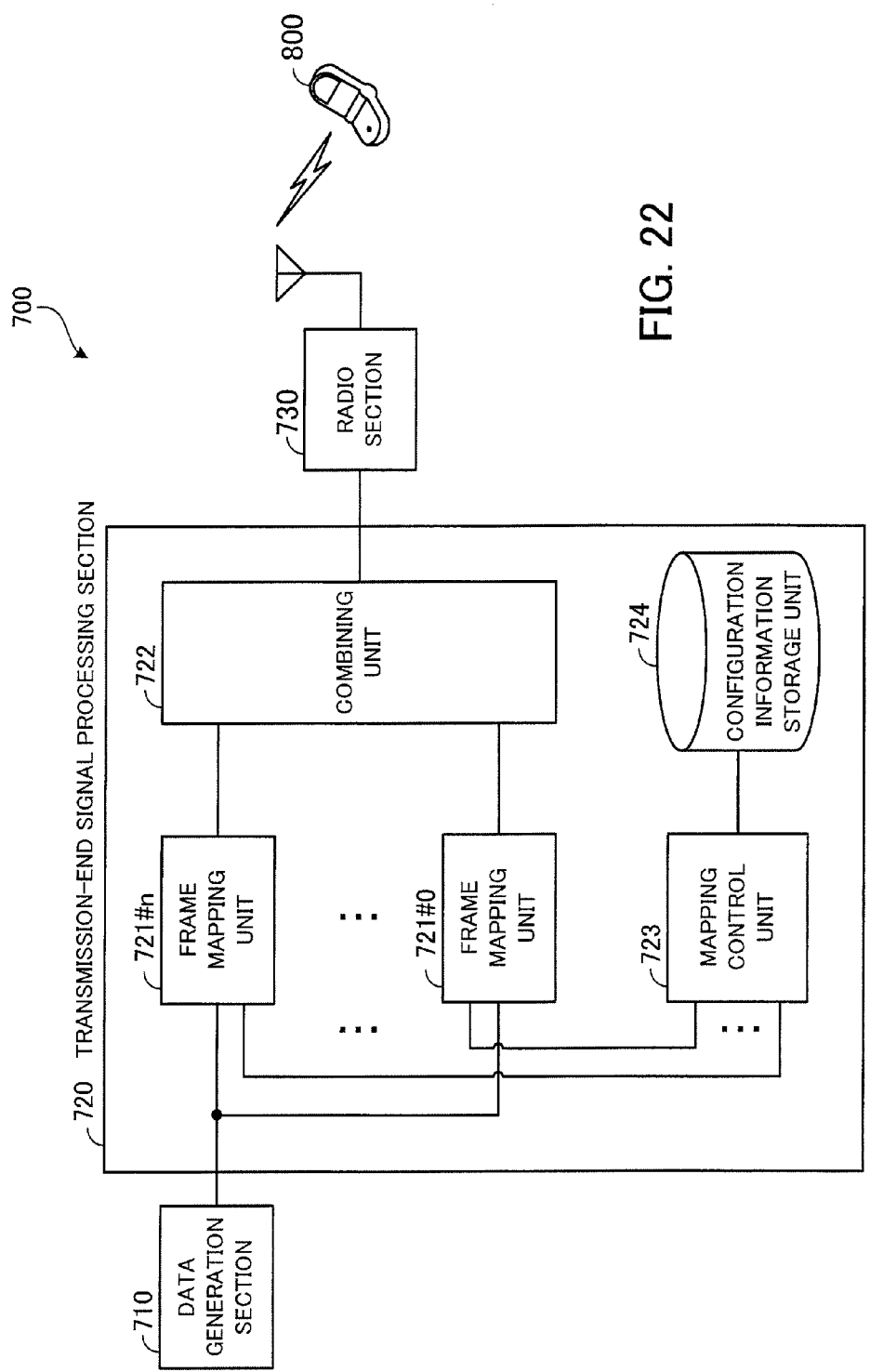
FIG. 22 is a block diagram of a transmission-end signal processing section of a base station in a fifth embodiment.

FIG. 22 is a block diagram of a transmission-end signal processing section of a base station in a fifth embodiment. As illustrated in FIG. 22, a base station 700 includes a data generation section 710, a transmission-end signal processing section 720, and a radio section 730. The transmission-end signal processing section 720 includes frame mapping units 721#0, . . . , and 721#n (n is a number which is one smaller than the number of component carriers included in a component carrier group used for communication, for example), a combining unit 722, a mapping control unit 723, and a configuration information storage unit 724.

The base station 700 in this embodiment controls a UL subframe and a DL subframe in each component carrier included in a component carrier group to be transmitted so that DL subframes will form a successive lump in all component carriers.

On the basis of data received from a core network 10, the data generation section 710 generates transmitted data to be transmitted to a mobile station 800.

The frame mapping units 721#0 through 721#n set DL subframes (transmission bands) used for transmitting data from the base station 700 and UL subframes (receiving bands) used for receiving data by the base station 700 in a component carrier group including a plurality of component carriers. It is assumed that a component carrier group includes a plurality of (five, for example) component carriers, that the component carrier group is transmitted from the base station 700 by radio communication, and that the component carrier group is received by the mobile station 800 as a component carrier group.

The number of the frame mapping units 721#0 through 721#n corresponds to that (five, for example) of the component carriers. The frame mapping units 721#0 through 721#n map transmitted data generated by the data generation section 710 to the component carriers. The frame mapping units 721#0 through 721#n map the transmitted data to the component carriers under the control of the mapping control unit 723 on the basis of whether an hour at that point of time is associated with a DL subframe or a UL subframe. If an hour at that point of time is associated with a DL subframe, then the mapping control unit 723 exercises control so as to map the transmitted data. If an hour at that point of time is associated with a UL subframe, then the mapping control unit 723 exercises control so as not to map the transmitted data. The frame mapping units 721#0 through 721#n are an example of the configuration section.

The combining unit 722 combines the component carriers to which the frame mapping units 721#0 through 721#n map transmitted data and performs subcarrier modulation.

On the basis of configuration information stored in the configuration information storage unit 724, the mapping control unit 723 controls the frame mapping units 721#0 through 721#n so that a UL subframe will not be included between any two DL subframes. The mapping control unit 723 is an example of the configuration control section.

Furthermore, when the mapping control unit 723 acquires receivable number notice indicative of the number of groups of receivable successive DL subframes which is sent from the mobile station 800 that is a data destination, the mapping control unit 723 determines a transmission band to be used on the basis of the acquired receivable number notice.

In addition, when the mapping control unit 723 acquires receiving quality information indicative of receiving quality which is transmitted from the mobile station 800 which is a data destination, the mapping control unit 723 changes a used transmission band on the basis of the acquired receiving quality information.

The configuration information storage unit 724 stores configuration information which indicates the association of an hour of the component carrier group used for communication with whether each subframe is a DL subframe or a UL subframe and in which the component carrier group is formed so that a UL subframe will not be included between any two DL subframes.

The radio section 730 up-converts a subcarrier-modulated signal indicative of component carriers combined by the combining unit 722 to a radio frequency signal, and transmits it via an antenna.

In this embodiment the arrangement of DL subframes and UL subframes in each component carrier is set in advance. Configuration information indicative of the set arrangement of DL subframes and UL subframes is stored in advance in the configuration information storage unit 724. DL subframes and UL subframes are set in each component carrier so that a UL subframe will not be included between DL subframes in any component carriers and so that DL subframes will form a successive lump in all component carriers.

If a receivable number indicated by receivable number notice sent from the mobile station 800 is one, then the mapping control unit 723 determines on the basis of the configuration information whether a component carrier at an hour is associated with a DL subframe or a UL subframe. If a component carrier at an hour is associated with a DL subframe, then the mapping control unit 723 determines that data can be transmitted by the use of the component carrier at the hour. Accordingly, the mapping control unit 723 informs a frame mapping unit (frame mapping unit 721#0 in the case of the number of the component carrier being, for example, CC#0) corresponding to the component carrier that data can be transmitted, that is to say, that transmitted data can be mapped to a radio resource of the component carrier. If a component carrier at an hour is associated with a UL subframe, then data is unable to be transmitted. Accordingly, the mapping control unit 723 gives the frame mapping unit instructions not to map transmitted data to a radio resource of the component carrier at the hour.

Therefore, if a receivable number indicated by receivable number notice sent from the mobile station 800 is one, then the base station 700 does not set a UL subframe between any two DL subframes in a component carrier group. As a result, DL subframe bands are lumped together so that they will appear in succession. This enables the mobile station 800 to extract DL subframes by one analog filter. If the mobile station 800 includes only one filter, then the base station 700 uses a component carrier group in which DL subframes are lumped together for performing communication with the mobile station 800. Accordingly, the number of analog filters used in the mobile station 800 can be reduced and the circuit scale of the mobile station 800 can be reduced.

Figure 23:
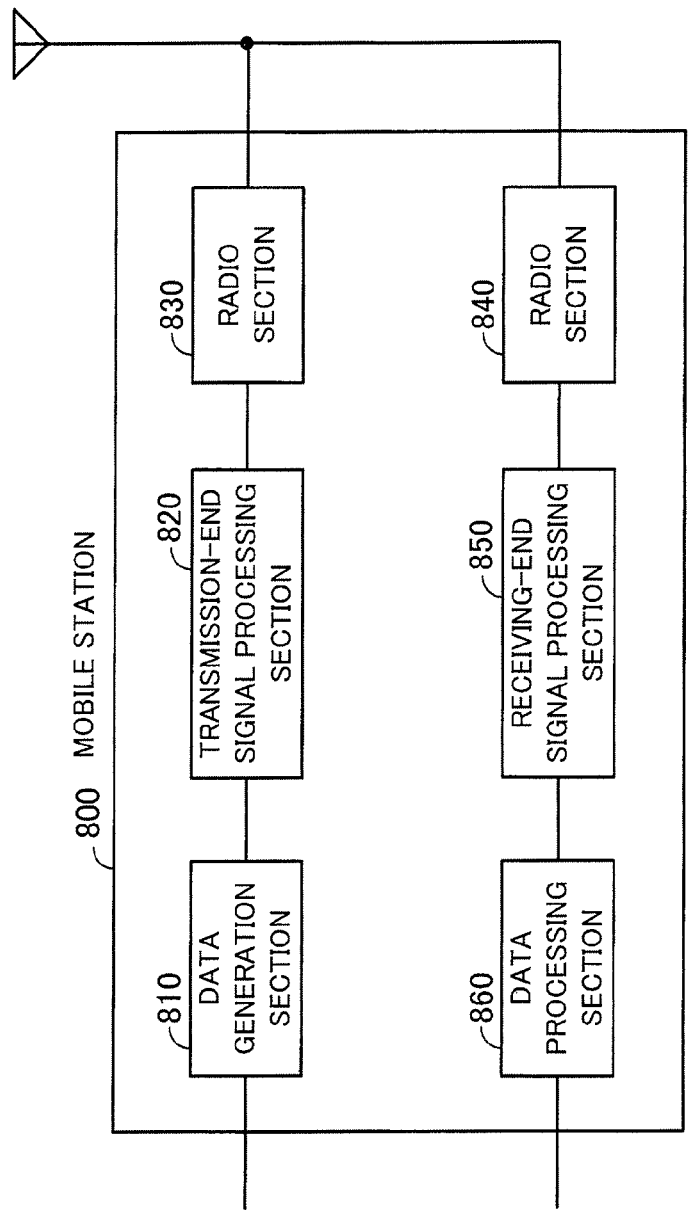
FIG. 23 illustrates the hardware configuration of a mobile station in the fifth embodiment.

FIG. 23 illustrates the hardware configuration of a mobile station in the fifth embodiment. As illustrated in FIG. 23, the mobile station 800 includes a data generation section 810, a transmission-end signal processing section 820, radio sections 830 and 840, a receiving-end signal processing section 850, and a data processing section 860.

On the basis of data received from a core network 10, the data generation section 810 generates data to be transmitted to the base station 700.

The transmission-end signal processing section 820 performs a process for transmitting data received from the core network 10 to the base station 700. For example, the transmission-end signal processing section 820 subcarrier-modulates data received from the core network 10. In addition, the transmission-end signal processing section 820 subcarrier-modulates a control channel.

Furthermore, if the mobile station 800 can receive, as with the mobile station 200 in the second embodiment or the like, only one group of successive DL subframes, then the transmission-end signal processing section 820 in this embodiment transmits receivable number notice to the base station 700 for informing the base station 700 that the mobile station 800 can receive only one group of successive DL subframes. The mobile station 800 can use a UL radio resource for transmitting the receivable number notice to the base station 700.

For example, if five component carriers are used for performing communication, then the number of groups of successive DL subframes is limited to one, two, or three. Accordingly, the mobile station 800 may transmit to the base station

700 receivable number notice including the number of receivable successive DL subframes.

Furthermore, if five component carriers are used for performing communication, there are thirty-one different combinations of a DL subframe and a UL subframe as described later in detail in FIG. 24. Therefore, the mobile station 800 may transmit to the base station 700 receivable number notice including, for example, 31-bit data. If the mobile station 800 can receive each combination, then the mobile station 800 sets "1" in the 31-bit data. If the mobile station 800 is unable to receive each combination, then the mobile station 800 sets "0" in the 31-bit data. On the basis of the received receivable number notice, the base station 700 determines component carriers used for performing communication with the mobile station 800.

In addition, when the mobile station 800 receives a DL subframe transmitted from the base station 700, the transmission-end signal processing section 820 in this embodiment transmits to the base station 700 receiving quality information indicative of receiving quality for the received DL subframe. The mobile station 800 can transmit the receiving quality information to the base station 700 by the use of a UL radio resource.

The radio section 830 up-converts a subcarrier-modulated signal outputted from the transmission-end signal processing section 820 to a radio frequency signal and radio-transmits it to the base station 700 via an antenna.

The radio section 840 down-converts a signal received from the base station 700 via the antenna to a base band signal and outputs it to the receiving-end signal processing section 850.

The receiving-end signal processing section 850 performs a demodulation process on the base band signal obtained as a result of the down-conversion by the radio section 840.

The data processing section 860 transmits to an upper layer data demodulated by the receiving-end signal processing section 850.

FIG. 24 indicates the arrangement of a DL subframe and a UL subframe in the fifth embodiment.

FIG. 24 indicates different patterns for the arrangement of a DL subframe and a UL subframe in component carriers used for communication between the base station 700 and the mobile station 800. In the example of FIG. 24, arrangement patterns which are possible in the case of using five component carriers are indicated.

CC Number indicates a number assigned for uniquely specifying an arrangement.

Arrangement indicates a concrete arrangement of a DL subframe and a UL subframe specified by a CC number. "D" indicates a DL subframe and "U" indicates a UL subframe.

DL Group Number indicates the number of groups of successive DL subframes. With the CC number "4" (arrangement "DDUDD"), for example, a UL subframe ("U") is arranged in the center and DL subframes are divided. However, two DL subframes ("DD") are arranged in succession at each end. Therefore, the number of groups of successive DL subframes is two. As a result, "2" is set as a DL group number.

In this embodiment one communication is performed by the use of a component carrier group including five component carriers. However, one communication may be performed by the use of a component carrier group including two to four component carriers or six or more component carriers.

Figure 25A:
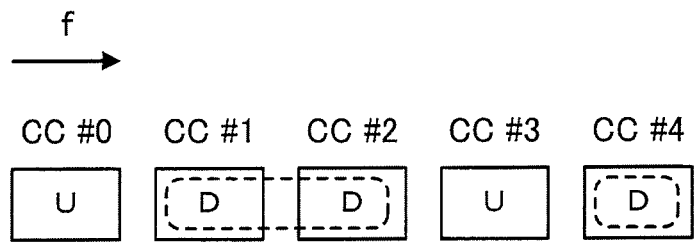
FIGS. 25A to 25C illustrate a change in DL subframe assignment in the fifth embodiment.
Figure 25B:
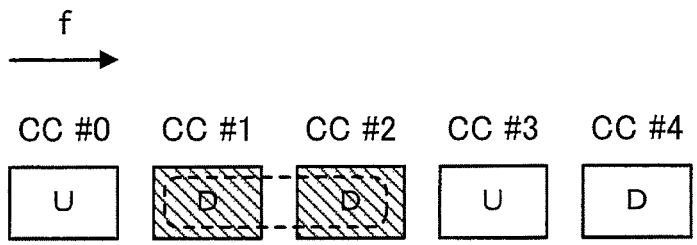
Figure 25C:
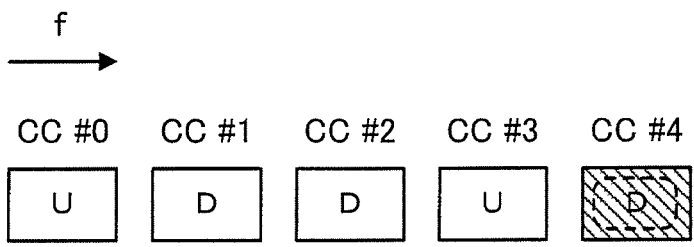

FIGS. 25A to 25C illustrate a change in DL subframe assignment in the fifth embodiment.

When the base station 700 receives receivable number notice transmitted from the mobile station 800, the base station 700 determines, on the basis of the received receivable number notice, component carriers to which DL subframes used for communication with the mobile station 800 are assigned.

At this time communication can be performed in this embodiment by the use of a part of a component carrier group. As illustrated in FIG. 25A, for example, it is assumed that DL subframes and UL subframes are set in CC#1, CC#2, and CC#4 and CC#0 and CC#3, respectively, in a UL-DL configuration at an hour. That is to say, in a component carrier group used for communication, successive DL subframes are set in CC#1 and CC#2 and a single DL subframe is set in CC#4.

Therefore, there are two groups of successive DL subframes in FIG. 25A. It is assumed that the mobile station 800 is able to receive one group of successive DL subframes and that the mobile station 800 is unable to receive two or more groups of successive DL subframes. In this case, the mobile station 800 transmits to the base station 700 receivable number notice to the effect that the mobile station 800 can receive one group of successive DL subframes.

When the base station 700 receives the receivable number notice to the effect that the mobile station 800 can receive one group of successive DL subframes, the base station 700 assigns DL subframes to be transmitted to the mobile station 800 to the component carrier group illustrated in FIG. 25A in accordance with the received receivable number notice. At this time the base station 700 can transmit one of four combinations of DL subframes, that is to say, only CC#1, only CC#2, successive CC#1 and CC#2 illustrated in FIG. 25B, or only CC#4 illustrated in FIG. 25C to the mobile station 800 that can receive one group of successive DL subframes. In other words, the base station 700 does not perform communication with the mobile station 800 by the use of a component carrier group in which CC#1, CC#2 and CC#4 or CC#2 and CC#4, for example, are combined, that is to say, in which a UL subframe is included between DL subframes.

Figure 26:
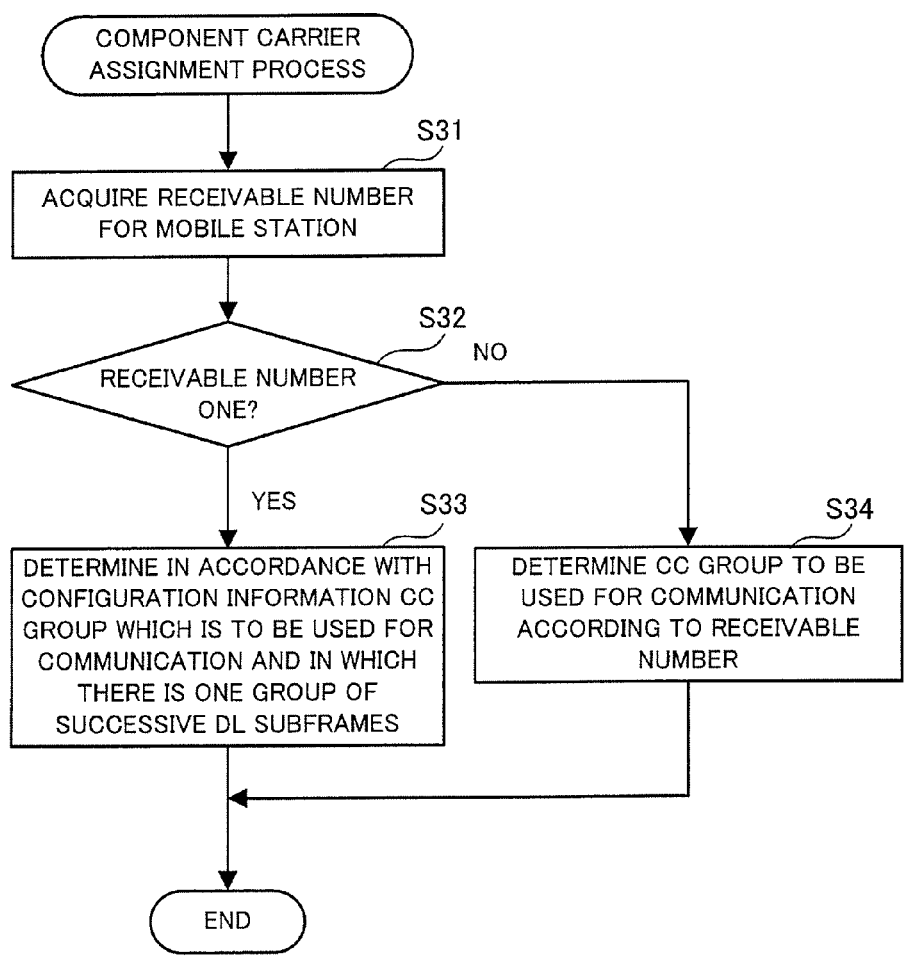
FIG. 26 is a flow chart of a procedure for a component carrier assignment process in the fifth embodiment.

FIG. 26 is a flow chart of a procedure for a component carrier assignment process in the fifth embodiment. When the base station 700 in this embodiment receives receivable number notice from the mobile station 800 and acquires the receivable number for the mobile station 800, the base station 700 performs, on the basis of the receivable number for the mobile station 800, a component carrier assignment process for assigning a component carrier group.

When the base station 700 receives the receivable number notice transmitted from the mobile station 800, the base station 700 begins to perform the component carrier assignment process. The component carrier assignment process indicated in FIG. 26 will now be described in order of step number.

(Step S31) The mapping control unit 723 acquires from receivable number notice transmitted from the mobile station 800 the number of groups of successive DL subframes which the mobile station 800 can receive. This receivable number notice is transmitted from the mobile station 800 to the base station 700, for example, at the time of performing a process for establishing communication.

(Step S32) The mapping control unit 723 determines whether or not the receivable number acquired in step S31 is one. If the receivable number acquired in step S31 is one, then the mapping control unit 723 proceeds to step S33. On the other hand, if the receivable number acquired in step S31 is not one (that is to say, the receivable number acquired in step S31 is two or greater), then the mapping control unit 723 proceeds to step S34.

(Step S33) The mapping control unit 723 determines, in accordance with configuration information stored in the configuration information storage unit 724, a component carrier group which is to be used for communication and in which there is one group of successive DL subframes, and uses the determined component carrier group for performing communication with the mobile station 800. After that, the process ends.

(Step S34) The mapping control unit 723 determines, on the basis of the receivable number acquired in step S31, a component carrier group which is to be used for communication and in which the number of groups of successive DL subframes is equal to or smaller than the receivable number, and uses the determined component carrier group for performing communication with the mobile station 800. After that, the process ends.

Figure 27:
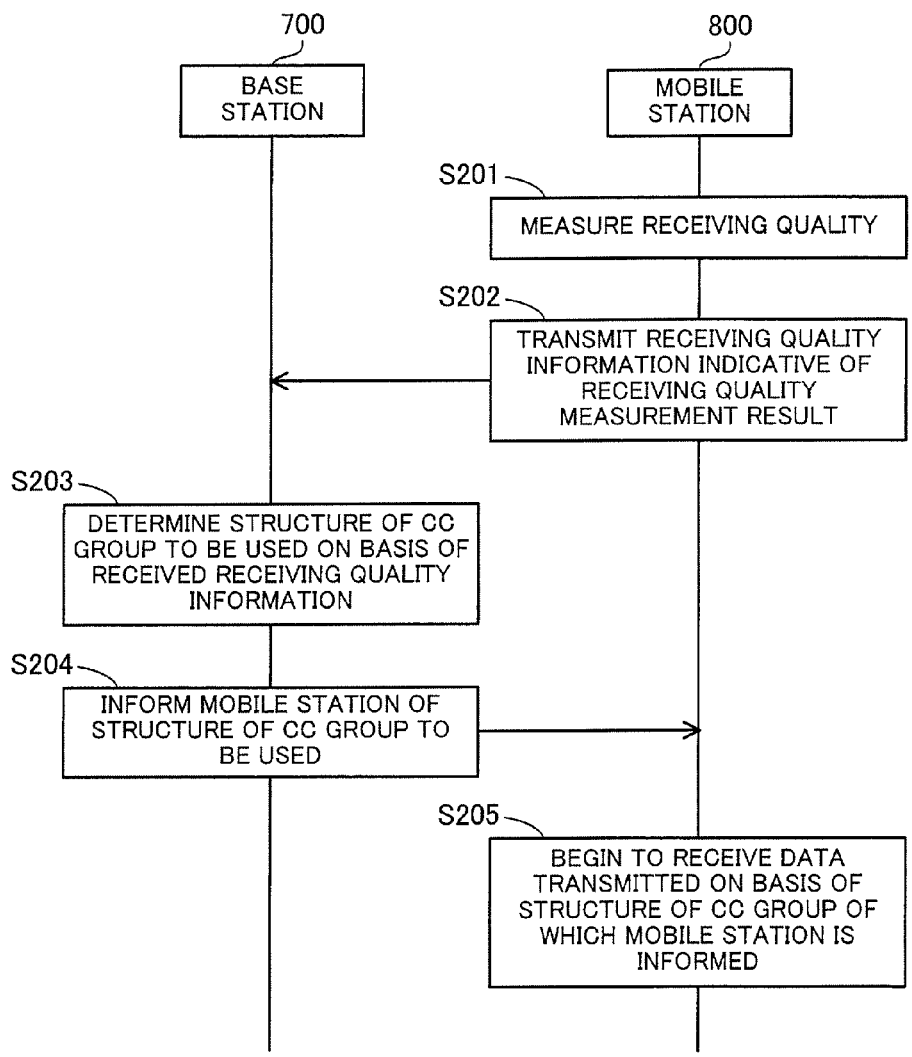
FIG. 27 is a sequence diagram of a procedure in the fifth embodiment at the time of changing a component carrier group on the basis of a receiving quality measurement result.

FIG. 27 is a sequence diagram of a procedure in the fifth embodiment at the time of changing a component carrier group on the basis of a receiving quality measurement result.

When the mobile station 800 performs communication in this embodiment with the base station 700 by the use of a component carrier group, the mobile station 800 measures receiving quality for a signal transmitted from the base station 700, and transmits a measurement result to the base station 700.

If the receiving quality measurement result transmitted from the mobile station 800 does not meet a determined standard and communication is interfered with or may be interfered with, then the base station 700 changes a combination of component carriers included in the component carrier group used for communication. By doing so, receiving quality for data transmitted from the base station 700 to the mobile station 800 is maintained. A procedure performed by the base station 700 and the mobile station 800 at the time of changing a component carrier group on the basis of a receiving quality measurement result will now be described with reference to FIG. 27.

(Step S201) The mobile station 800 measures receiving quality for a DL subframe transmitted from the base station 700.

(Step S202) The mobile station 800 transmits to the base station 700 receiving quality information indicative of a result obtained by measuring receiving quality in step S201.

(Step S203) On the basis of the receiving quality information received in step S202, the base station 700 determines the structure of a component carrier group to be used for communication. At this time, if the receiving quality indicated by the receiving quality information meets a determined standard, then the base station 700 determines continuous use of a component carrier group currently used. On the other hand, if the receiving quality indicated by the receiving quality information does not meet the determined standard, then the base station 700 makes up a new component carrier group different from the component carrier group currently used, and determines the use of the new component carrier group.

(Step S204) The base station 700 informs the mobile station 800 of the structure of a component carrier group to be used for communication which is determined in step S203.

(Step S205) The mobile station 800 begins to receive DL data transmitted from the base station 700 on the basis of the structure of a component carrier group of which the base station 700 informs the mobile station 800 in step S204.

As has been described, according to the fifth embodiment receiving quality information indicative of receiving quality at the mobile station 800 is transmitted to the base station 700 with the second embodiment as a premise. If receiving quality does not meet a determined standard, then the base station 700 changes a component carrier group used for communication. As a result, deterioration in receiving quality at the mobile station 800 can be prevented.

Furthermore, receivable number notice indicative of the number of groups of successive DL subframes which the mobile station 800 can receive is transmitted to the base station 700. The base station 700 sets a component carrier group according to a receivable number for the mobile station 800. If the mobile station 800 includes only one analog filter, then the base station 700 does not set a UL subframe between any two DL subframes in a component carrier group and performs communication by the use of a component carrier group in which the number of groups of successive DL subframes is always one. By doing so, communication can be performed by the use of a component carrier group corresponding to the number of filters included in the mobile station 800.

According to the disclosed radio communication apparatus, radio communication system, and radio communication method, it is possible to reduce the number of analog filters and therefore circuit size at a receiving end.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication apparatus configured to transmit and receive data by using a band group including a plurality of frequency bands that is configured to be a set as transmission bands used for data transmission or as receiving bands used for data reception, the radio communication apparatus comprising:
a configuration section configured to set the transmission bands and the receiving bands in the band group; and
a configuration control section configured to control the configuration section such that the transmission bands in the band group at an hour of each subframe are allocated to continuous frequencies.

2. The radio communication apparatus according to claim 1, wherein the configuration control is further configured to control the configuration section such that the receiving bands are not set in bands in which frequencies of the bands are lower than or equal to frequencies of the transmission bands in the band group.

3. The radio communication apparatus according to claim 1, wherein the configuration control section is further configured to control the configuration section such that the receiving bands are not set in bands in which frequencies of the bands are higher than or equal to frequencies of the transmission bands in the band group.

4. The radio communication apparatus according to claim 1, wherein the configuration control section is further configured to control the configuration section such that a central transmission band of the transmission bands is set close to a center of the band group.

5. The radio communication apparatus according to claim 1, wherein the configuration control section is further configured to control the configuration section such that each of the transmission bands is not included between the receiving bands in the band group.

6. The radio communication apparatus according to claim L further comprising:

a configuration information storage section configured to store configuration information which indicates association of an hour of the band group, with whether each band in the band group is a transmission band or a receiving band, and in which the band group is formed such that each of the receiving bands is not included between the transmission bands, wherein the configuration control section is further configured to control the configuration section based on the configuration information stored in the configuration information storage section such that each of the receiving bands is not included between the transmission bands.

7. A radio communication system configured to transmit and receive data by using a band group including a plurality of bands that is configured to be set as transmission bands used for transmitting data from a first radio communication apparatus or as receiving bands used for receiving data by a second radio communication apparatus, the first radio communication apparatus included in the radio communication system including:
- a configuration section configured to set the transmission bands and the receiving bands in the band group; and
- a configuration control section configured to control the configuration section such that the transmission bands in the band group at an hour of each subframe are allocated to continuous frequencies, the second radio communication apparatus included in the radio communication system including:
- a filter section configured to include a filter that is able to extract from a band group one transmission band or a plurality of transmission bands between which a receiving band is not included; and
- a filter control section configured to control the filter section so as to extract, at a time of receiving a band group which is transmitted from the first radio communication apparatus and in which setting is performed such that transmission bands at an hour of each subframe are allocated to continuous frequencies, the transmission bands being selected from the received band group.

8. A radio communication method- for transmitting and receiving data by using a band group including a plurality of bands that is configured to be set as transmission bands used for data transmission or as receiving bands used for data receiving, the radio communication method comprising:

setting in the band group the transmission bands used for data transmission and the receiving bands used for data reception, the transmission bands being allocated, at an hour of each subframe, to continuous frequencies; and transmitting data by using the set transmission bands.

\* \* \* \* \*